United States Patent
Furuta

(10) Patent No.: US 11,912,090 B2
(45) Date of Patent: Feb. 27, 2024

(54) DAMPING CONTROL DEVICE AND DAMPING CONTROL METHOD

(71) Applicant: Toyota Jidosha Kabushiki Kaisha, Toyota (JP)

(72) Inventor: Hiroki Furuta, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 490 days.

(21) Appl. No.: 17/242,638

(22) Filed: Apr. 28, 2021

(65) Prior Publication Data
US 2021/0379953 A1 Dec. 9, 2021

(30) Foreign Application Priority Data
Jun. 4, 2020 (JP) .................................. 2020-097679

(51) Int. Cl.
*B60G 17/0165* (2006.01)

(52) U.S. Cl.
CPC .... *B60G 17/0165* (2013.01); *B60G 2400/206* (2013.01); *B60G 2400/252* (2013.01); *B60G 2400/821* (2013.01); *B60G 2400/92* (2013.01); *B60G 2500/104* (2013.01); *B60G 2600/182* (2013.01)

(58) Field of Classification Search
CPC .......... B60G 17/0165; B60G 2400/206; B60G 2400/252
See application file for complete search history.

(56) References Cited

U.S. PATENT DOCUMENTS

| | | | | |
|---|---|---|---|---|
| 7,949,446 B2* | 5/2011 | Koumura | ........... | B60G 17/0182 701/38 |
| 8,296,009 B2* | 10/2012 | Kajino | ............... | B60G 17/0165 701/37 |
| 2010/0138108 A1* | 6/2010 | Kajino | ................. | B60G 17/016 701/38 |
| 2010/0324780 A1* | 12/2010 | Koumura | ........... | B60G 21/0555 701/38 |
| 2018/0162186 A1* | 6/2018 | Anderson | ............ | A61B 5/4023 |

FOREIGN PATENT DOCUMENTS

| | | |
|---|---|---|
| JP | H08020212 A | 1/1996 |
| JP | 2009-096366 A | 5/2009 |
| JP | 2009-119947 A | 6/2009 |
| JP | 2016-107778 A | 6/2016 |
| WO | 2009063959 A1 | 5/2009 |

* cited by examiner

Primary Examiner — Redhwan K Mawari
(74) *Attorney, Agent, or Firm* — Dinsmore & Shohl LLP

(57) ABSTRACT

A damping control device for a vehicle calculates a combined control force by adding together a control force when a front wheel passes through a predicted passing position and a control force when a rear wheel passes through a predicted passing position, and calculates a final control force for the front wheel and a final control force for the rear wheel by distributing the combined control force at a predetermined distribution ratio.

10 Claims, 10 Drawing Sheets

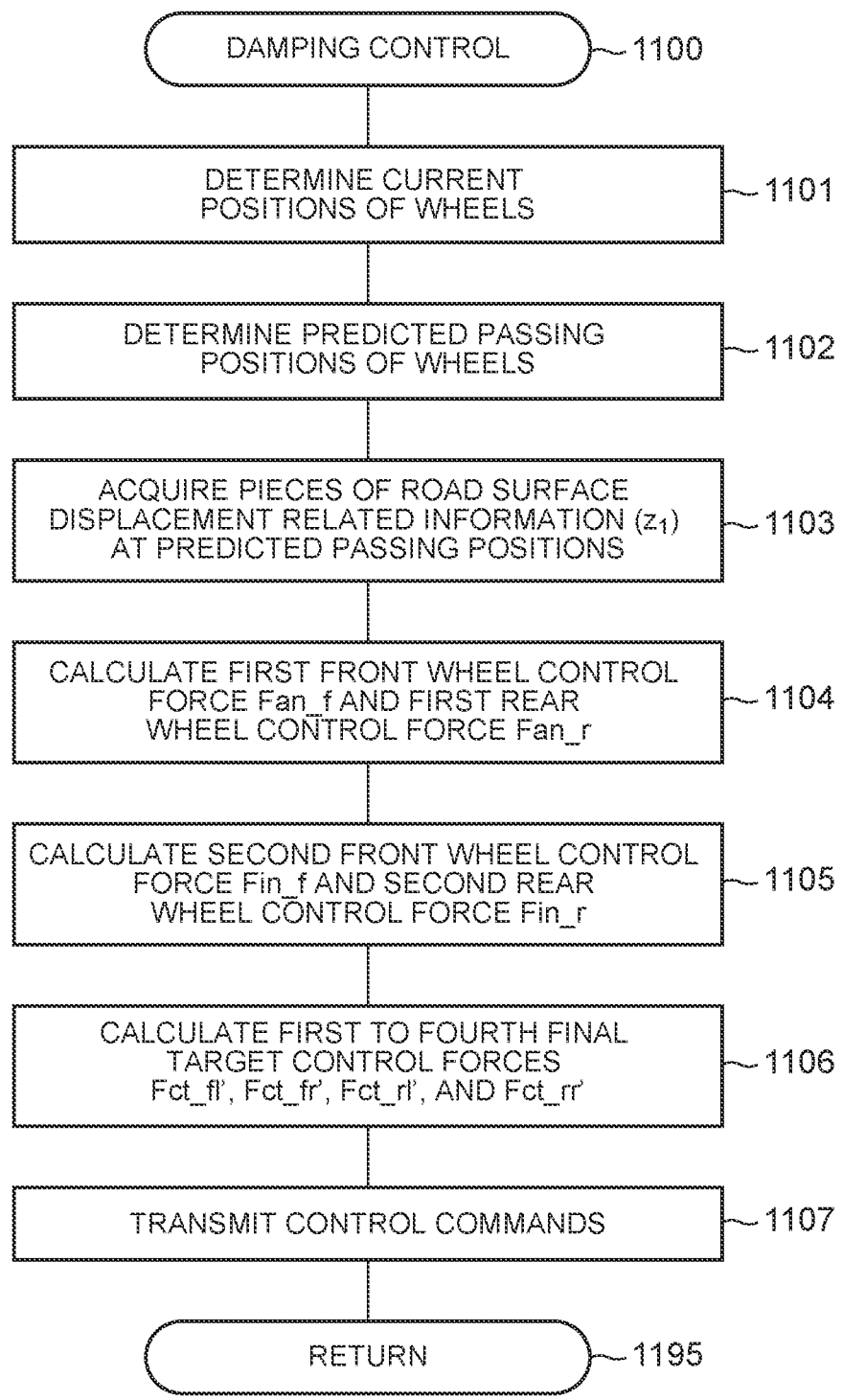

DAMPING CONTROL DEVICE AND DAMPING CONTROL METHOD

CROSS-REFERENCE TO RELATED APPLICATION

This application claims priority to Japanese Patent Application No. 2020-097679 filed on Jun. 4, 2020, incorporated herein by reference in its entirety.

BACKGROUND

1. Technical Field

The present disclosure relates to a damping control device and a damping control method for a vehicle.

2. Description of Related Art

Hitherto, there is a proposal for a device (hereinafter referred to as "related-art device") configured to perform damping control for a sprung portion of a vehicle by controlling actuators provided on front wheels and rear wheels of the vehicle using information related to vertical displacements of a road surface where the wheels are predicted to pass (road surface displacements) (for example, Japanese Unexamined Patent Application Publication No. 08-020212 (JP 08-020212 A)). Such control is referred to also as "preview damping control".

SUMMARY

The related-art device executes the preview damping control without consideration of a relationship between the road surface displacement on the front wheel and the road surface displacement on the rear wheel. Therefore, unnecessary energy is consumed in the following situation. It is assumed that a vehicle travels along a road having repetitive undulations and the wheelbase of the vehicle agrees with a half of a wavelength of a waveform of a road surface displacement. In this case, no vertical displacement occurs at the center-of-gravity position of the vehicle. However, the related-art device controls the actuators of the front wheel and the rear wheel in the vertical direction in response to the road surface displacements. Thus, the related-art device may unnecessarily drive the actuators in the preview damping control. Therefore, a problem arises in that unnecessary energy is consumed in control force generating devices such as the actuators.

The present disclosure provides a technology that can reduce the possibility of unnecessary energy consumption in the control force generating device when the preview damping control is executed.

A first aspect of the present disclosure provides a damping control device for a vehicle having wheels including a front wheel and a rear wheel. The damping control device includes:
  a control force generating device configured to generate a vertical control force for damping a sprung portion of the vehicle between each of the wheels and a portion of a vehicle body that corresponds to a position of each of the wheels;
  an information acquirer configured to acquire pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements ($z_0$) that are the vertical displacements of the road surface at the predicted passing position, a road surface displacement speed ($dz_0$) that is a time derivative of the road surface displacements at the predicted passing position, an unsprung displacement ($z_1$) that is a vertical displacement of an unsprung portion of the vehicle at the predicted passing position, and an unsprung speed ($dz_1$) that is a time derivative of the unsprung displacement at the predicted passing position; and
  a control unit configured to control the control force generating device to change the control force.
The control unit is configured to:
calculate, as a first control force, the control force (Fct_f) for the front wheel when the front wheel passes through the predicted passing position, based on the road surface displacement related information at the predicted passing position of the front wheel;
calculate, as a second control force, the control force (Fct_r) for the rear wheel when the rear wheel passes through the predicted passing position, based on the road surface displacement related information at the predicted passing position of the rear wheel;
calculate a combined control force (Fcta) by adding together the first control force and the second control force;
calculate a first final target control force (Fct_f') that is a final target value of the control force for the front wheel and a second final target control force (Fct_r') that is a final target value of the control force for the rear wheel by distributing the combined control force at a predetermined distribution ratio;
control the control force generating device such that the control force generating device generates the control force that agrees with the first final target control force in the front wheel at the timing when the front wheel passes through the predicted passing position of the front wheel; and
control the control force generating device such that the control force generating device generates the control force that agrees with the second final target control force in the rear wheel at the timing when the rear wheel passes through the predicted passing position of the rear wheel.

For example, it is assumed that the vehicle travels along a road having repetitive undulations and the wheelbase of the vehicle agrees with a half of a wavelength of a waveform of road surface displacements of the road. In this situation, no vertical displacement occurs at the center-of-gravity position of the vehicle. According to the configuration described above, the damping control device calculates the combined control force by adding together the first control force and the second control force. Through this calculation, an upward control force and a downward control force are canceled out, and as a result, the magnitude of the combined control force decreases. The damping control device distributes the combined control force to the front wheel and the rear wheel at the predetermined distribution ratio. Through this control, a possibility of unnecessary driving of the control force generating device can be reduced in the situation in which the center-of-gravity position of the vehicle is not displaced in the vertical direction. The possibility of unnecessary energy consumption in the control force generating device can be reduced.

In the first aspect, the control force generating device may include active actuators provided on the wheels, respectively. The control unit may be configured to calculate the first final target control force (Fct_f') and the second final target control force (Fct_r') by distributing the combined control force (Fcta) at a higher ratio to an actuator having higher performance out of the active actuator of the front wheel and the active actuator of the rear wheel.

According to the configuration described above, the combined control force is distributed at the higher ratio to the actuator having higher performance. Thus, vibration of the sprung portion of the vehicle can effectively be reduced when the control force generating device is driven.

A second aspect of the present disclosure provides a damping control device for a vehicle having wheels including right and left front wheels and right and left rear wheels. The damping control device includes:

a control force generating device configured to generate a vertical control force for damping a sprung portion of the vehicle between each of the wheels and a portion of a vehicle body that corresponds to a position of each of the wheels;

an information acquirer configured to acquire pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements ($z_0$) that are the vertical displacements of the road surface at the predicted passing position, a road surface displacement speed ($dz_0$) that is a time derivative of the road surface displacements at the predicted passing position, an unsprung displacement ($z_1$) that is a vertical displacement of an unsprung portion of the vehicle at the predicted passing position, and an unsprung speed ($dz_1$) that is a time derivative of the unsprung displacement at the predicted passing position; and a control unit configured to control the control force generating device to change the control force.

The control unit is configured to:

calculate a first-situation control force (Fcd) adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel;

calculate a first front wheel control force (Fan_f) for the right and left front wheels adapted to the first situation and a first rear wheel control force (Fan_r) for the right and left rear wheels adapted to the first situation by distributing the first-situation control force at a predetermined distribution ratio;

calculate a second front wheel control force (Fin_f) for the right and left front wheels adapted to a second situation in which the waveform of the road surface displacements on the right side of the vehicle and the waveform of the road surface displacements on the left side of the vehicle have identical phases, based on the road surface displacement related information at the predicted passing position of the right front wheel and the road surface displacement related information at the predicted passing position of the left front wheel;

calculate a second rear wheel control force (Fin_r) for the right and left rear wheels adapted to the second situation based on the road surface displacement related information at the predicted passing position of the right rear wheel and the road surface displacement related information at the predicted passing position of the left rear wheel;

calculate a first final target control force (Fct_fl') that is a final target value of the control force for the left front wheel and a second final target control force (Fct_fr') that is a final target value of the control force for the right front wheel based on the first front wheel control force and the second front wheel control force;

calculate a third final target control force (Fct_rl') that is a final target value of the control force for the left rear wheel and a fourth final target control force (Fct_rr') that is a final target value of the control force for the right rear wheel based on the first rear wheel control force and the second rear wheel control force;

control the control force generating device such that the control force generating device generates the control force that agrees with the first final target control force in the left front wheel at the timing when the left front wheel passes through the predicted passing position of the left front wheel;

control the control force generating device such that the control force generating device generates the control force that agrees with the second final target control force in the right front wheel at the timing when the right front wheel passes through the predicted passing position of the right front wheel;

control the control force generating device such that the control force generating device generates the control force that agrees with the third final target control force in the left rear wheel at the timing when the left rear wheel passes through the predicted passing position of the left rear wheel; and control the control force generating device such that the control force generating device generates the control force that agrees with the fourth final target control force in the right rear wheel at the timing when the right rear wheel passes through the predicted passing position of the right rear wheel.

According to the configuration described above, the damping control device calculates the final target values of the control forces of the wheels (first final target control force, second final target control force, third final target control force, and fourth final target control force) based on the control force adapted to the first situation (first front wheel control force or first rear wheel control force) and the control force adapted to the second situation (second front wheel control force or second rear wheel control force) for the wheels (right and left front wheels and right and left rear wheels). Thus, the possibility of unnecessary driving of the control force generating device can be reduced in, for example, a situation in which no roll displacement occurs in the vehicle (first situation). Accordingly, the possibility of unnecessary energy consumption in the control force generating device can be reduced.

In actuality, the waveform of the road surface displacements on the right side of the vehicle and the waveform of the road surface displacements on the left side of the vehicle do not completely have opposite phases or identical phases.

In many cases, those waveforms include both components in opposite phases and components in identical phases. According to the configuration described above, the damping control device can control the control force generating device by appropriate control forces in consideration of both the components in opposite phases and the components in identical phases. Thus, the vibration of the sprung portion of the vehicle can be reduced by the appropriate control forces while reducing the possibility of unnecessary driving of the control force generating device.

In the second aspect, the control unit may be configured to calculate the first-situation control force (Fcd) by adding together a control force adapted to a situation in which the waveform of the road surface displacements at the right front wheel and the waveform of the road surface displacements at the left front wheel have opposite phases (may be regarded as a first term on a right-hand side in Expression (14)) and a control force adapted to a situation in which the waveform of the road surface displacements at the right rear wheel and the waveform of the road surface displacements at the left rear wheel have opposite phases (may be regarded as a second term on the right-hand side in Expression (14)).

According to the configuration described above, the upward control force and the downward control force are canceled out through the addition described above in the first situation. As a result, the magnitude of the first-situation control force decreases. Thus, the possibility of unnecessary driving of the control force generating device in the first situation can be reduced.

In the second aspect, the control force generating device may include active actuators provided on the wheels, respectively. The control unit may be configured to calculate the first front wheel control force (Fan_f) and the first rear wheel control force (Fan_r) by distributing the first-situation control force (Fcd) at a higher ratio to an actuator having higher performance out of the active actuators of the front wheels and the active actuators of the rear wheels.

According to the configuration described above, the first-situation control force is distributed at the higher ratio to the actuator having higher performance. Thus, the vibration of the sprung portion of the vehicle can effectively be reduced when the control force generating device is driven.

A third aspect of the present disclosure provides a damping control device for a vehicle having wheels including right and left front wheels and right and left rear wheels. The damping control device includes:
  a control force generating device configured to generate a vertical control force for damping a sprung portion of the vehicle between each of the wheels and a portion of a vehicle body that corresponds to a position of each of the wheels;
  an information acquirer configured to acquire pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements ($z_0$) that are the vertical displacements of the road surface at the predicted passing position, a road surface displacement speed ($dz_0$) that is a time derivative of the road surface displacements at the predicted passing position, an unsprung displacement ($z_1$) that is a vertical displacement of an unsprung portion of the vehicle at the predicted passing position, and an unsprung speed ($dz_1$) that is a time derivative of the unsprung displacement at the predicted passing position; and
  a control unit configured to control the control force generating device to change the control force.

The control unit is configured to:
calculate a first-situation control force (Fcd) adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel;
calculate a first front wheel control force (Fan_f) for the right and left front wheels adapted to the first situation and a first rear wheel control force (Fan_r) for the right and left rear wheels adapted to the first situation by distributing the first-situation control force at a predetermined distribution ratio;
control, based on the first front wheel control force, the control force to be generated by the control force generating device in the right front wheel at the timing when the right front wheel passes through the predicted passing position of the right front wheel, and the control force to be generated by the control force generating device in the left front wheel at the timing when the left front wheel passes through the predicted passing position of the left front wheel; and
control, based on the first rear wheel control force, the control force to be generated by the control force generating device in the right rear wheel at the timing when the right rear wheel passes through the predicted passing position of the right rear wheel, and the control force to be generated by the control force generating device in the left rear wheel at the timing when the left rear wheel passes through the predicted passing position of the left rear wheel.

In the third aspect, the control force generating device may be an active stabilizer device.

A fourth aspect of the present disclosure provides a damping control method for a vehicle. The vehicle has wheels including a front wheel and a rear wheel, and a control force generating device configured to generate a vertical control force for damping a sprung portion of the vehicle between each of the wheels and a portion of a vehicle body that corresponds to a position of each of the wheels.

The damping control method includes:
acquiring pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements ($z_0$) that are the vertical displacements of the road surface at the predicted passing position, a road surface displacement speed ($dz_0$) that is a time derivative of the road surface displacements at the predicted passing position, an unsprung displacement ($z_1$) that is a vertical displacement of an unsprung portion of the vehicle at the predicted passing position, and an unsprung speed ($dz_1$) that is a time derivative of the unsprung displacement at the predicted passing position; and controlling the control force generating device to change the control force.

The controlling includes:

calculating, as a first control force, the control force (Fct_f) for the front wheel when the front wheel passes through the predicted passing position, based on the road surface displacement related information at the predicted passing position of the front wheel;

calculating, as a second control force, the control force (Fct_r) for the rear wheel when the rear wheel passes through the predicted passing position, based on the road surface displacement related information at the predicted passing position of the rear wheel;

calculating a combined control force (Fcta) by adding together the first control force and the second control force;

calculating a first final target control force (Fct_f') that is a final target value of the control force for the front wheel and a second final target control force (Fct_r') that is a final target value of the control force for the rear wheel by distributing the combined control force at a predetermined distribution ratio;

controlling the control force generating device such that the control force generating device generates the control force that agrees with the first final target control force in the front wheel at the timing when the front wheel passes through the predicted passing position of the front wheel; and controlling the control force generating device such that the control force generating device generates the control force that agrees with the second final target control force in the rear wheel at the timing when the rear wheel passes through the predicted passing position of the rear wheel.

A fifth aspect of the present disclosure provides a damping control method for a vehicle. The vehicle has wheels including right and left front wheels and right and left rear wheels, and a control force generating device configured to generate a vertical control force for damping a sprung portion of the vehicle between each of the wheels and a portion of a vehicle body that corresponds to a position of each of the wheels.

The damping control method includes:

acquiring pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements ($z_0$) that are the vertical displacements of the road surface at the predicted passing position, a road surface displacement speed ($dz_0$) that is a time derivative of the road surface displacements at the predicted passing position, an unsprung displacement ($z_1$) that is a vertical displacement of an unsprung portion of the vehicle at the predicted passing position, and an unsprung speed ($dz_1$) that is a time derivative of the unsprung displacement at the predicted passing position; and controlling the control force generating device to change the control force.

The controlling includes:

calculating a first-situation control force (Fcd) adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel;

calculating a first front wheel control force (Fan_f) for the right and left front wheels adapted to the first situation and a first rear wheel control force (Fan_r) for the right and left rear wheels adapted to the first situation by distributing the first-situation control force at a predetermined distribution ratio;

calculating a second front wheel control force (Fin_f) for the right and left front wheels adapted to a second situation in which the waveform of the road surface displacement on the right side of the vehicle and the waveform of the road surface displacement on the left side of the vehicle have identical phases, based on the road surface displacement related information at the predicted passing position of the right front wheel and the road surface displacement related information at the predicted passing position of the left front wheel;

calculating a second rear wheel control force (Fin_r) for the right and left rear wheels adapted to the second situation based on the road surface displacement related information at the predicted passing position of the right rear wheel and the road surface displacement related information at the predicted passing position of the left rear wheel;

calculating a first final target control force (Fct_fl') that is a final target value of the control force for the left front wheel and a second final target control force (Fct_fr') that is a final target value of the control force for the right front wheel based on the first front wheel control force and the second front wheel control force;

calculating a third final target control force (Fct_rl') that is a final target value of the control force for the left rear wheel and a fourth final target control force (Fct_rr') that is a final target value of the control force for the right rear wheel based on the first rear wheel control force and the second rear wheel control force;

controlling the control force generating device such that the control force generating device generates the control force that agrees with the first final target control force in the left front wheel at the timing when the left front wheel passes through the predicted passing position of the left front wheel;

controlling the control force generating device such that the control force generating device generates the control force that agrees with the second final target control force in the right front wheel at the timing when the right front wheel passes through the predicted passing position of the right front wheel;

controlling the control force generating device such that the control force generating device generates the control force that agrees with the third final target control force in the left rear wheel at the timing when the left rear wheel passes through the predicted passing position of the left rear wheel; and controlling the control force generating device such that the control force generating device generates the control force that agrees with the fourth final target control force in the right rear wheel at the timing when the right rear wheel passes through the predicted passing position of the right rear wheel.

A sixth aspect of the present disclosure provides a damping control method for a vehicle. The vehicle has wheels including right and left front wheels and right and left rear wheels, and a control force generating device configured to generate a vertical control force for damping a sprung portion of the vehicle between each of the wheels and a portion of a vehicle body that corresponds to a position of each of the wheels.

The damping control method includes:
acquiring pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements ($z_0$) that are the vertical displacements of the road surface at the predicted passing position, a road surface displacement speed ($dz_0$) that is a time derivative of the road surface displacements at the predicted passing position, an unsprung displacement ($z_1$) that is a vertical displacement of an unsprung portion of the vehicle at the predicted passing position, and an unsprung speed ($dz_1$) that is a time derivative of the unsprung displacement at the predicted passing position; and
controlling the control force generating device to change the control force.

The controlling includes:
calculating a first-situation control force (Fcd) adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel;
calculating a first front wheel control force (Fan_f) for the right and left front wheels adapted to the first situation and a first rear wheel control force (Fan_r) for the right and left rear wheels adapted to the first situation by distributing the first-situation control force at a predetermined distribution ratio;
controlling, based on the first front wheel control force, the control force to be generated by the control force generating device in the right front wheel at the timing when the right front wheel passes through the predicted passing position of the right front wheel, and the control force to be generated by the control force generating device in the left front wheel at the timing when the left front wheel passes through the predicted passing position of the left front wheel; and
controlling, based on the first rear wheel control force, the control force to be generated by the control force generating device in the right rear wheel at the timing when the right rear wheel passes through the predicted passing position of the right rear wheel, and the control force to be generated by the control force generating device in the left rear wheel at the timing when the left rear wheel passes through the predicted passing position of the left rear wheel.

In the aspects described above, the control unit may be implemented by a microprocessor programmed to perform one or more functions described herein. In the aspects described above, the control unit may entirely or partially be implemented by hardware including one or more application-specific integrated circuits, that is, ASICs.

In the description above, constituent elements corresponding to those in one or more embodiments described later are accompanied with parenthesized names and/or reference symbols used in the embodiments. The constituent elements are not limited to those in the embodiments defined by the names and/or the reference symbols. Other objects, other features, and accompanying advantages of the present disclosure will easily be understood from the description of one or more embodiments with reference to the drawings below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 is a flowchart illustrating a routine to be executed by a CPU of an electronic control unit according to a second embodiment.

DETAILED DESCRIPTION OF EMBODIMENTS

Structure

Figure 1:
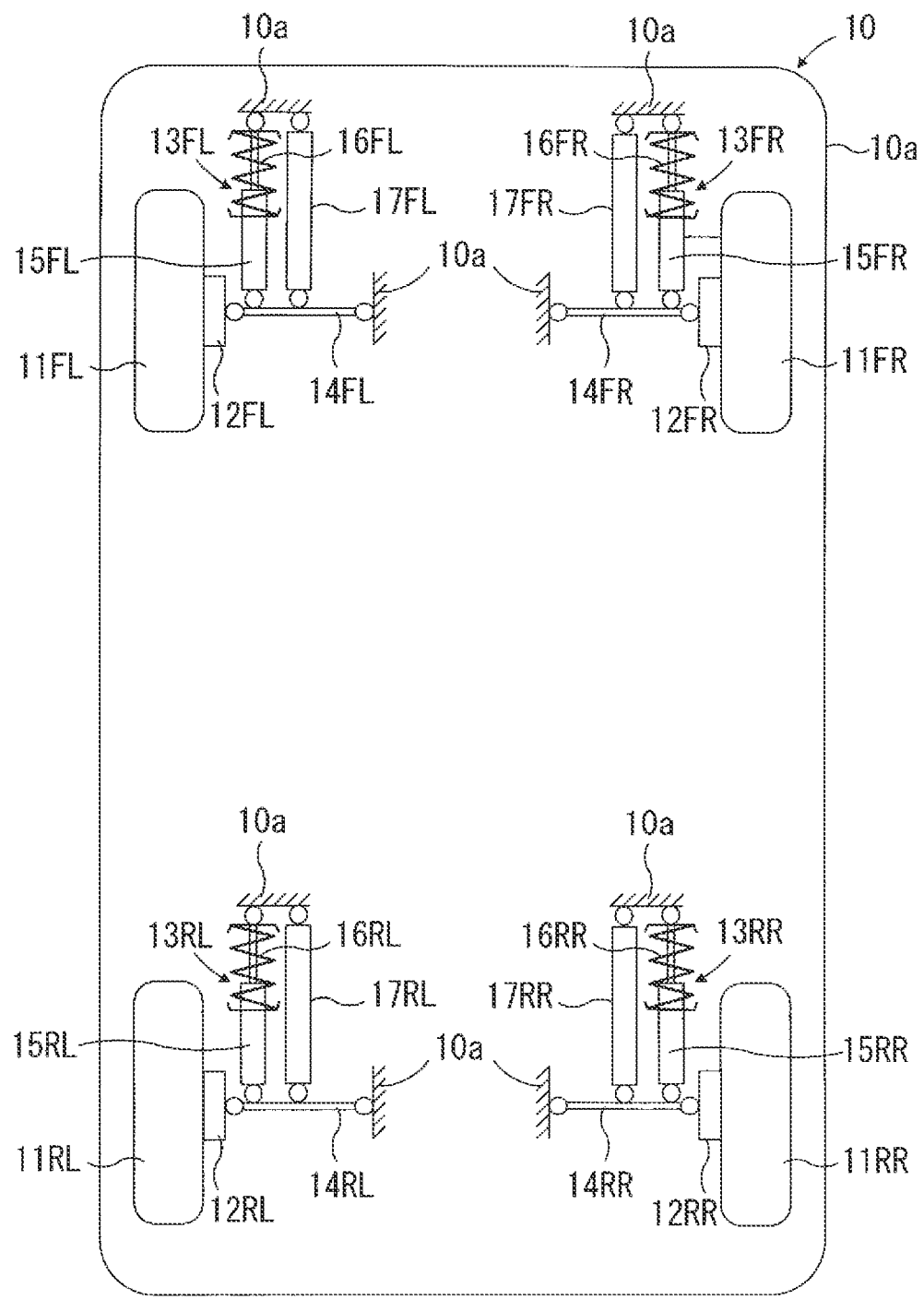
FIG. 1 is a schematic structural diagram of a vehicle to which a damping control device according to one or more embodiments is applied.
Figure 2:
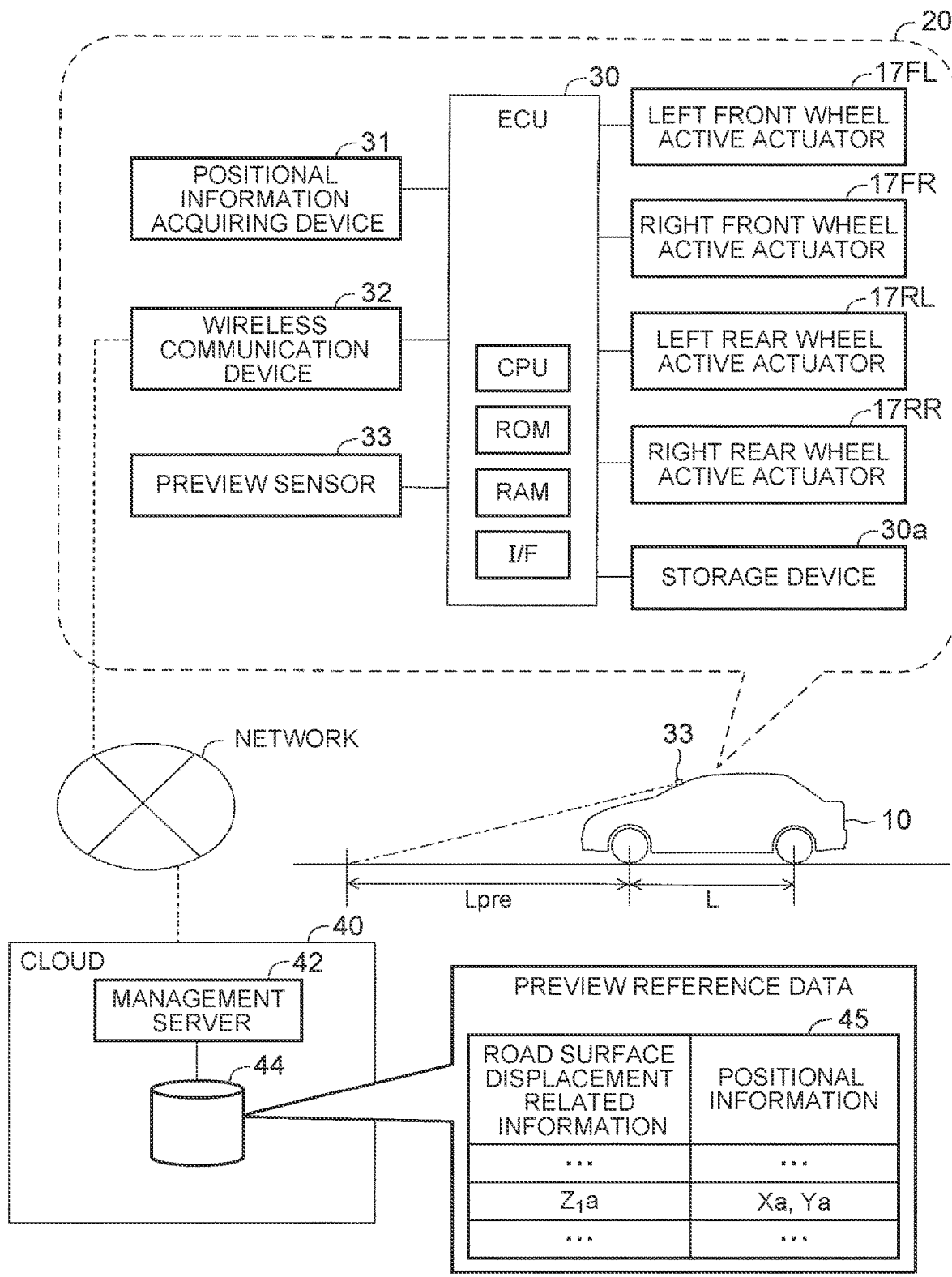
FIG. 2 is a schematic structural diagram of the damping control device according to the one or more embodiments.

A damping control device according to one or more embodiments is applied to a vehicle 10 illustrated in FIG. 1. As illustrated in FIG. 2, the damping control device is hereinafter referred to also as "damping control device 20".

As illustrated in FIG. 1, the vehicle 10 includes a right front wheel 11FR, a left front wheel 11FL, a right rear wheel 11RR, and a left rear wheel 11RL. The right front wheel 11FR is rotatably supported on a vehicle body 10a by a wheel support member 12FR. The left front wheel 11FL is rotatably supported on the vehicle body 10*a* by a wheel support member 12FL. The right rear wheel 11RR is rotatably supported on the vehicle body 10*a* by a wheel support member 12RR. The left rear wheel 11RL is rotatably supported on the vehicle body 10*a* by a wheel support member 12RL.

The right front wheel 11FR, the left front wheel 11FL, the right rear wheel 11RR, and the left rear wheel 11RL are referred to as "wheels 11" unless otherwise distinguished. Similarly, the right front wheel 11FR and the left front wheel 11FL are referred to as "front wheels 11F". Similarly, the right rear wheel 11RR and the left rear wheel 11RL are referred to as "rear wheels 11R". The wheel support members 12FR to 12RL are referred to as "wheel support members 12".

The vehicle 10 further includes a right front wheel suspension 13FR, a left front wheel suspension 13FL, a right rear wheel suspension 13RR, and a left rear wheel suspension 13RL. Details of the suspensions 13FR to 13RL are described below. The suspensions 13FR to 13RL are independent suspensions, but other types of suspension may be employed.

The right front wheel suspension 13FR suspends the right front wheel 11FR from the vehicle body 10*a*, and includes a suspension arm 14FR, a shock absorber 15FR, and a suspension spring 16FR. The left front wheel suspension 13FL suspends the left front wheel 11FL from the vehicle body 10*a*, and includes a suspension arm 14FL, a shock absorber 15FL, and a suspension spring 16FL.

The right rear wheel suspension 13RR suspends the right rear wheel 11RR from the vehicle body 10*a*, and includes a suspension arm 14RR, a shock absorber 15RR, and a suspension spring 16RR. The left rear wheel suspension 13RL suspends the left rear wheel 11RL from the vehicle body 10*a*, and includes a suspension arm 14RL, a shock absorber 15RL, and a suspension spring 16RL.

The right front wheel suspension 13FR, the left front wheel suspension 13FL, the right rear wheel suspension 13RR, and the left rear wheel suspension 13RL are referred to as "suspensions 13" unless otherwise distinguished. Similarly, the suspension arms 14FR to 14RL are referred to as "suspension arms 14". Similarly, the shock absorbers 15FR to 15RL are referred to as "shock absorbers 15". Similarly, the suspension springs 16FR to 16RL are referred to as "suspension springs 16".

The suspension arm 14 couples the wheel support member 12 to the vehicle body 10*a*. In FIG. 1, one suspension arm 14 is provided for one suspension 13. In another example, a plurality of suspension arms 14 may be provided for one suspension 13.

The shock absorber 15 is provided between the vehicle body 10*a* and the suspension arm 14. The upper end of the shock absorber 15 is coupled to the vehicle body 10*a*. The lower end of the shock absorber 15 is coupled to the suspension arm 14. The suspension spring 16 is provided between the vehicle body 10*a* and the suspension arm 14 via the shock absorber 15. That is, the upper end of the suspension spring 16 is coupled to the vehicle body 10*a*, and the lower end of the suspension spring 16 is coupled to a cylinder of the shock absorber 15. In this structure of the suspension spring 16, the shock absorber 15 may be provided between the vehicle body 10*a* and the wheel support member 12.

In this example, the shock absorber 15 is a non-adjustable shock absorber. In another example, the shock absorber 15 may be an adjustable shock absorber. The suspension spring 16 may be provided between the vehicle body 10*a* and the suspension arm 14 without intervention of the shock absorber 15. That is, the upper end of the suspension spring 16 may be coupled to the vehicle body 10*a*, and the lower end of the suspension spring 16 may be coupled to the suspension arm 14. In this structure of the suspension spring 16, the shock absorber 15 and the suspension spring 16 may be provided between the vehicle body 10*a* and the wheel support member 12.

Regarding the members such as the wheel 11 and the shock absorber 15 of the vehicle 10, a portion close to the wheel 11 with respect to the suspension spring 16 is referred to as "unsprung portion 50 or unsprung member 50 (see FIG. 3)". Regarding the members such as the vehicle body 10*a* and the shock absorber 15 of the vehicle 10, a portion close to the vehicle body 10*a* with respect to the suspension spring 16 is referred to as "sprung portion 51 or sprung member 51 (see FIG. 3)".

A right front wheel active actuator 17FR, a left front wheel active actuator 17FL, a right rear wheel active actuator 17RR, and a left rear wheel active actuator 17RL are provided between the vehicle body 10*a* and the suspension arms 14FR to 14RL, respectively. The active actuators 17FR to 17RL are provided in parallel to the shock absorbers 15FR to 15RL and the suspension springs 16FR to 16RL, respectively.

The right front wheel active actuator 17FR, the left front wheel active actuator 17FL, the right rear wheel active actuator 17RR, and the left rear wheel active actuator 17RL are referred to as "active actuators 17" unless otherwise distinguished. Similarly, the right front wheel active actuator 17FR and the left front wheel active actuator 17FL are referred to as "front wheel active actuators 17F". Similarly, the right rear wheel active actuator 17RR and the left rear wheel active actuator 17RL are referred to as "rear wheel active actuators 17R".

The active actuator 17 generates a control force Fc based on a control command from an electronic control unit 30 illustrated in FIG. 2. The control force Fc is a vertical force acting between the vehicle body 10*a* and the wheel 11 (that is, between the sprung portion 51 and the unsprung portion 50) to damp the sprung portion 51. The electronic control unit 30 is referred to as "ECU 30", and may be referred to as "control unit or controller". The active actuator 17 may be referred to as "control force generating device". The active actuator 17 is an electromagnetic active actuator. The active actuator 17 serves as an active suspension in cooperation with, for example, the shock absorber 15 and the suspension spring 16.

As illustrated in FIG. 2, the damping control device 20 includes the ECU 30, a storage device 30*a*, a positional information acquiring device 31, a wireless communication device 32, and a preview sensor 33. The damping control device 20 further includes the active actuators 17FR to 17RL.

The ECU 30 includes a microcomputer. The microcomputer includes a CPU, a read-only memory (ROM), a random-access memory (RAM), and an interface (I/F). The CPU executes instructions (programs or routines) stored in the ROM to implement various functions.

The ECU 30 is connected to the non-volatile storage device 30*a* in which information is readable and writable. In this example, the storage device 30*a* is a hard disk drive. The ECU 30 can store information in the storage device 30*a*, and can read information stored in the storage device 30*a*. The storage device 30*a* is not limited to the hard disk drive, and may be a known storage device or storage medium in which information is readable and writable.

The ECU 30 is connected to the positional information acquiring device 31, the wireless communication device 32, and the preview sensor 33.

The positional information acquiring device 31 includes a global navigation satellite system (GNSS) receiver and a map database. The GNSS receiver receives, from an artificial satellite, a signal (for example, GNSS signal) for detecting a position of the vehicle 10 at a current time (current position). The map database stores road map information and the like. The positional information acquiring device 31 acquires the current position (for example, latitude and longitude) of the vehicle 10 based on the GNSS signal. Examples of the positional information acquiring device 31 include a navigation device.

The ECU 30 acquires "vehicle speed V1 of vehicle 10 and traveling direction Td of vehicle 10" at a current time from the positional information acquiring device 31.

The wireless communication device 32 is a wireless communication terminal for communicating information with a cloud 40 via a network. The cloud 40 includes "management server 42 and at least one storage device 44" connected to the network.

The management server 42 includes a CPU, a ROM, a RAM, and an interface (I/F). The management server 42 retrieves and reads data stored in the storage device 44, and writes data into the storage device 44.

The storage device 44 stores preview reference data 45. "Road surface displacement related information and positional information" are registered in the preview reference data 45 while being linked to (associated with) each other.

The road surface displacement related information is related to a vertical displacement of a road surface of a road, which indicates undulations of the road surface. Specifically, the road surface displacement related information includes at least one of a road surface displacement $z_0$ that is the vertical displacement of the road surface, a road surface displacement speed $dz_0$ that is a time derivative of the road surface displacement $z_0$, an unsprung displacement $z_1$ that is a vertical displacement of the unsprung portion 50, and an unsprung speed $dz_1$ that is a time derivative of the unsprung displacement $z_1$. In this example, the road surface displacement related information is the unsprung displacement $z_1$. When the vehicle 10 travels along the road surface, the unsprung portion 50 is displaced in the vertical direction in response to the displacement of the road surface. The unsprung displacement $z_1$ is a vertical displacement of the unsprung portion 50 associated with a position of each wheel 11 of the vehicle 10.

The positional information indicates a position (for example, latitude and longitude) of the road surface associated with the road surface displacement related information. FIG. 2 illustrates an unsprung displacement "$Z_1a$" and positional information "Xa, Ya" as examples of "unsprung displacement $z_1$ and positional information" registered as the preview reference data 45.

The preview sensor 33 acquires a value indicating a vertical displacement of a road surface ahead of the vehicle 10 (that is, road surface displacement $z_0$). The preview sensor 33 may be any publicly known preview sensor in this technical field as long as the road surface displacement $z_0$ ahead of the vehicle 10 can be acquired. Examples of the preview sensor 33 include a camera sensor, a Light Detection and Ranging (LIDAR) sensor, a radar, and combinations of those sensors.

As illustrated in FIG. 2, the preview sensor 33 is attached to, for example, an upper-end inner surface of a windshield of the vehicle 10 at the center in a vehicle width direction, and detects a road surface displacement $z_0$ at a position that is a predetermined preview distance $L_{pre}$ ahead of the front wheel 11F. The preview distance $L_{pre}$ is larger than a front wheel preview distance $L_{pf}$ (described later) when the vehicle speed of the vehicle 10 is a maximum rated vehicle speed. FIG. 2 illustrates one preview sensor 33, but a pair of preview sensors may be provided in association with the right and left front wheels. The preview sensor 33 is used in a modified example described later.

The ECU 30 is connected to the right front wheel active actuator 17FR, the left front wheel active actuator 17FL, the right rear wheel active actuator 17RR, and the left rear wheel active actuator 17RL via drive circuits (not illustrated).

The ECU 30 calculates a target control force Fct for damping the sprung portion 51 of each wheel 11, and controls the active actuator 17 to generate a control force that corresponds to (agrees with) the target control force Fct when each wheel 11 passes through a predicted passing position.

Overview of Basic Preview Damping Control

Figure 3:
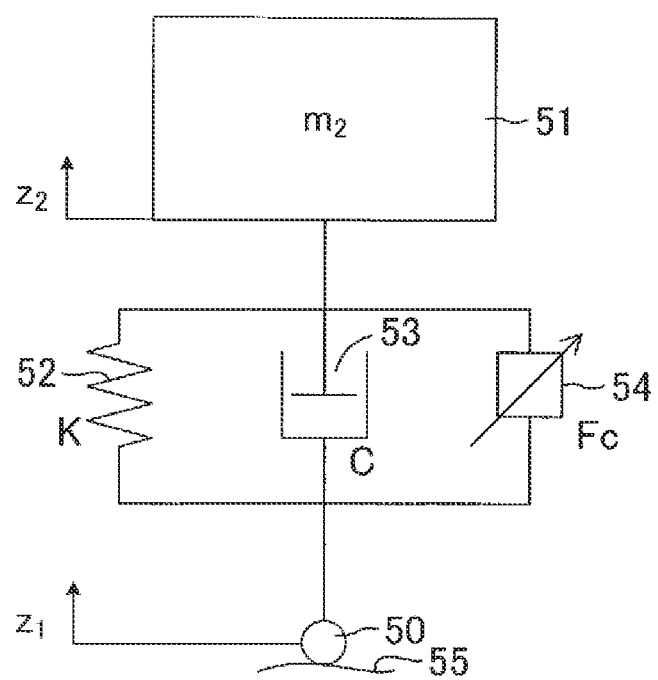
FIG. 3 is a diagram illustrating a single-wheel model of a vehicle.

An overview of basic preview damping control to be executed by the damping control device 20 is described below. FIG. 3 illustrates a single-wheel model of the vehicle 10 on a road surface 55.

A spring 52 corresponds to the suspension spring 16. A damper 53 corresponds to the shock absorber 15. An actuator 54 corresponds to the active actuator 17.

In FIG. 3, a mass of the sprung portion 51 is referred to as "sprung mass $m_2$". A vertical displacement of the sprung portion 51 is referred to as "sprung displacement $z_2$". The sprung displacement $z_2$ is a vertical displacement of the sprung portion 51 associated with a position of each wheel 11. A spring rate (equivalent spring rate) of the spring 52 is referred to as "spring rate K". A damping coefficient (equivalent damping coefficient) of the damper 53 is referred to as "damping coefficient C". A force generated by the actuator 54 is referred to as "control force Fc". Similarly to the above, a symbol "$z_1$" represents a vertical displacement of the unsprung portion 50 (unsprung displacement).

Time derivatives of $z_1$ and $z_2$ are represented by "$dz_1$" and "$dz_2$", respectively. Second-order time derivatives of $z_1$ and $z_2$ are represented by "$ddz_1$" and "$ddz_2$", respectively. In the following description, an upward displacement of each of $z_1$ and $z_2$ is defined to be positive, and an upward force generated by each of the spring 52, the damper 53, and the actuator 54 is defined to be positive.

In the single-wheel model of the vehicle 10 illustrated in FIG. 3, an equation of motion regarding a vertical motion of the sprung portion 51 can be represented by Expression (1).

$$m_2 ddz_2 = C(dz_1 - dz_2) + K(z_1 - z_2) - Fc \quad (1)$$

In Expression (1), the damping coefficient C is assumed to be constant. However, an actual damping coefficient changes depending on a stroke speed of the suspension 13. Therefore, the damping coefficient C may be set to, for example, a value that changes depending on a time derivative of the stroke H.

When vibration of the sprung portion 51 is completely canceled out by the control force Fc (that is, when the sprung acceleration $ddz_2$, the sprung speed $dz_2$, and the sprung displacement $z_2$ are "0"), the control force Fc is represented by Expression (2).

$$Fc = Cdz_1 + Kz_1 \quad (2)$$

Vibration of the sprung displacement $z_2$ when the control force Fc is represented by Expression (3) is discussed. In Expression (3), α is an arbitrary constant larger than 0 and equal to or smaller than 1.

$$Fc = \alpha(Cdz_1 + Kz_1) \quad (3)$$

When Expression (3) is applied to Expression (1), Expression (1) can be represented by Expression (4).

$$m_2 ddz_2 = C(dz_1 - dz_2) + K(z_1 - z_2) - \alpha(Cdz_1 + Kz_1) \quad (4)$$

Expression (5) is obtained when Expression (4) is subjected to Laplace transform and the resultant expression is rearranged. That is, a transfer function from the unsprung displacement $z_1$ to the sprung displacement $z_2$ is represented by Expression (5). In Expression (5), "s" represents a Laplace operator.

$$\frac{z_2}{z_1} = \frac{(1-\alpha)(Cs+K)}{m_2 s^2 + Cs + K} \quad (5)$$

According to Expression (5), the transfer function changes depending on a. When α is an arbitrary value larger than 0 and equal to or smaller than 1, it is observed that the magnitude of the transfer function is securely smaller than "1" (that is, the vibration of the sprung portion 51 can be reduced). When α is 1, the magnitude of the transfer function is "0". Therefore, it is observed that the vibration of the sprung portion 51 is completely canceled out. The target control force Fct can be represented by Expression (6) based on Expression (3).

$$Fct = \alpha \cdot C \cdot dz_1 + \alpha \cdot K \cdot z_1 \quad (6)$$

Thus, the ECU 30 calculates the target control force Fct by acquiring in advance (previewing) an unsprung displacement $z_1$ at a position where the wheel 11 passes in the future (predicted passing position), and applying the acquired unsprung displacement $z_1$ to Expression (6).

The ECU 30 causes the actuator 54 to generate a control force Fc corresponding to the target control force Fct at a timing when the wheel 11 passes through the predicted passing position (that is, at a timing when the unsprung displacement $z_1$ applied to Expression (6) occurs). With this configuration, the vibration of the sprung portion 51 can be reduced when the wheel 11 passes through the predicted passing position (that is, when the unsprung displacement $z_1$ applied to Expression (6) occurs).

The ECU 30 may calculate the target control force Fct based on Expression (7) obtained by omitting the derivative term ($\alpha \cdot C \cdot dz_1$) from Expression (6). Also in this case, the ECU 30 can cause the actuator 54 to generate the control force Fc for reducing the vibration of the sprung portion 51. Thus, the vibration of the sprung portion 51 can be reduced as compared to a case where the control force Fc is not generated.

$$Fct = \alpha \cdot K \cdot z_1 \quad (7)$$

The control described above is damping control for the sprung portion 51, which is referred to as "preview damping control".

In the single-wheel model, the mass of the unsprung portion 50 and elastic deformation of tires are ignored, and the road surface displacement $z_0$ that is the vertical displacement of the road surface 55 is assumed to be identical to the unsprung displacement $z_1$. In another example, similar preview damping control may be executed by using the road surface displacement $z_0$ and/or the road surface displacement speed $dz_0$ in place of or in addition to the unsprung displacement $z_1$ and the unsprung speed $dz_1$.

Overview of Preview Damping Control for Front Wheel and Rear Wheel

Next, an overview of the preview damping control for the front wheel and the rear wheel is described with reference to FIG. 4 to FIG. 6. In the following description, a suffix "_f" assigned to various control forces (Fct and Fc) represents correspondence to the front wheel 11F, and a suffix "_r" assigned to various control forces (Fct and Fc) represents correspondence to the rear wheel 11R.

Figure 4:
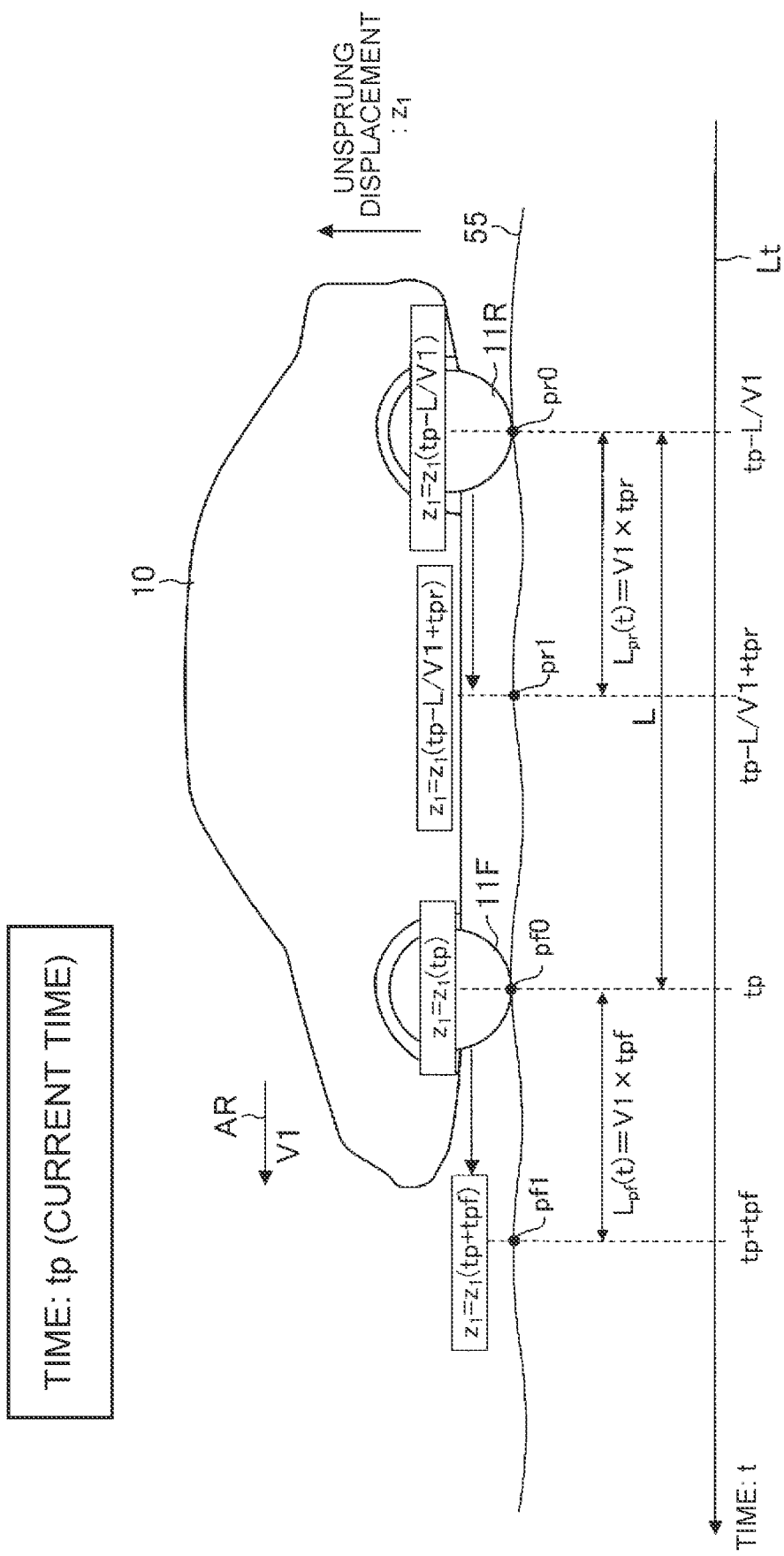
FIG. 4 is a diagram for describing preview damping control.

FIG. 4 illustrates the vehicle 10 traveling at a vehicle speed V1 in a direction indicated by an arrow AR at a current time tp. In the following description, the front wheel 11F and the rear wheel 11R are right or left wheels, and the moving speeds of the front wheel 11F and the rear wheel 11R are equal to the vehicle speed V1.

In FIG. 4, a line Lt is a virtual time axis t. Unsprung displacements $z_1$ of the front wheel 11F on a movement path at current, past, and future times t are represented by a function $z_1(t)$ of the times t. Thus, an unsprung displacement $z_1$ of the front wheel 11F at a position (contact point) pf0 at the current time tp is represented by $z_1(tp)$. An unsprung displacement $z_1$ of the rear wheel 11R at a position pr0 at the current time tp corresponds to an unsprung displacement $z_1$ of the front wheel 11F at a time "tp–L/V1" earlier than the current time tp by "period (L/V1) required for front wheel 11F to move by wheelbase L". Thus, the unsprung displacement $z_1$ of the rear wheel 11R at the current time tp is represented by $z_1(tp-L/V1)$.

Preview Damping Control for Front Wheel 11F

The ECU 30 determines a predicted passing position pf1 of the front wheel 11F at a time later (in the future) than the current time tp by a front wheel preview period tpf. The front wheel preview period tpf is preset to a period required from the timing when the ECU 30 determines the predicted passing position pf1 to the timing when the front wheel active actuator 17F outputs a control force Fc_f corresponding to a target control force Fct_f.

The predicted passing position pf1 of the front wheel 11F is a position spaced away from the position pf0 at the current time tp by a front wheel preview distance $L_{pf}$ (=V1×tpf) along a predicted path of the front wheel 11F. The predicted path of the front wheel 11F means a path where the front wheel 11F is predicted to move. As described later in detail, the position pf0 is calculated based on a current position of the vehicle 10 that is acquired by the positional information acquiring device 31.

The ECU 30 acquires in advance a part of the preview reference data 45 in an area near the current position of the vehicle 10 (preparatory $z_0$ ne described later) from the cloud 40. The ECU 30 acquires an unsprung displacement $z_1(tp+tpf)$ based on the determined predicted passing position pf1 and the part of the preview reference data 45 acquired in advance.

The ECU 30 calculates a target control force Fct_f of the front wheel 11F by applying the unsprung displacement $z_1(tp+tpf)$ to the unsprung displacement $z_1$ in Expression (8). The symbol "af" represents a gain for the front wheel 11F. The symbol "Kf" represents a spring rate of the right front wheel suspension 13FR and the left front wheel suspension 13FL.

$$Fct\_f = af \cdot Kf \cdot z_1 \quad (8)$$

The ECU 30 transmits a control command containing the target control force Fct_f to the front wheel active actuator 17F to cause the front wheel active actuator 17F to generate a control force Fc_f that corresponds to (agrees with) the target control force Fct_f.

Figure 5:
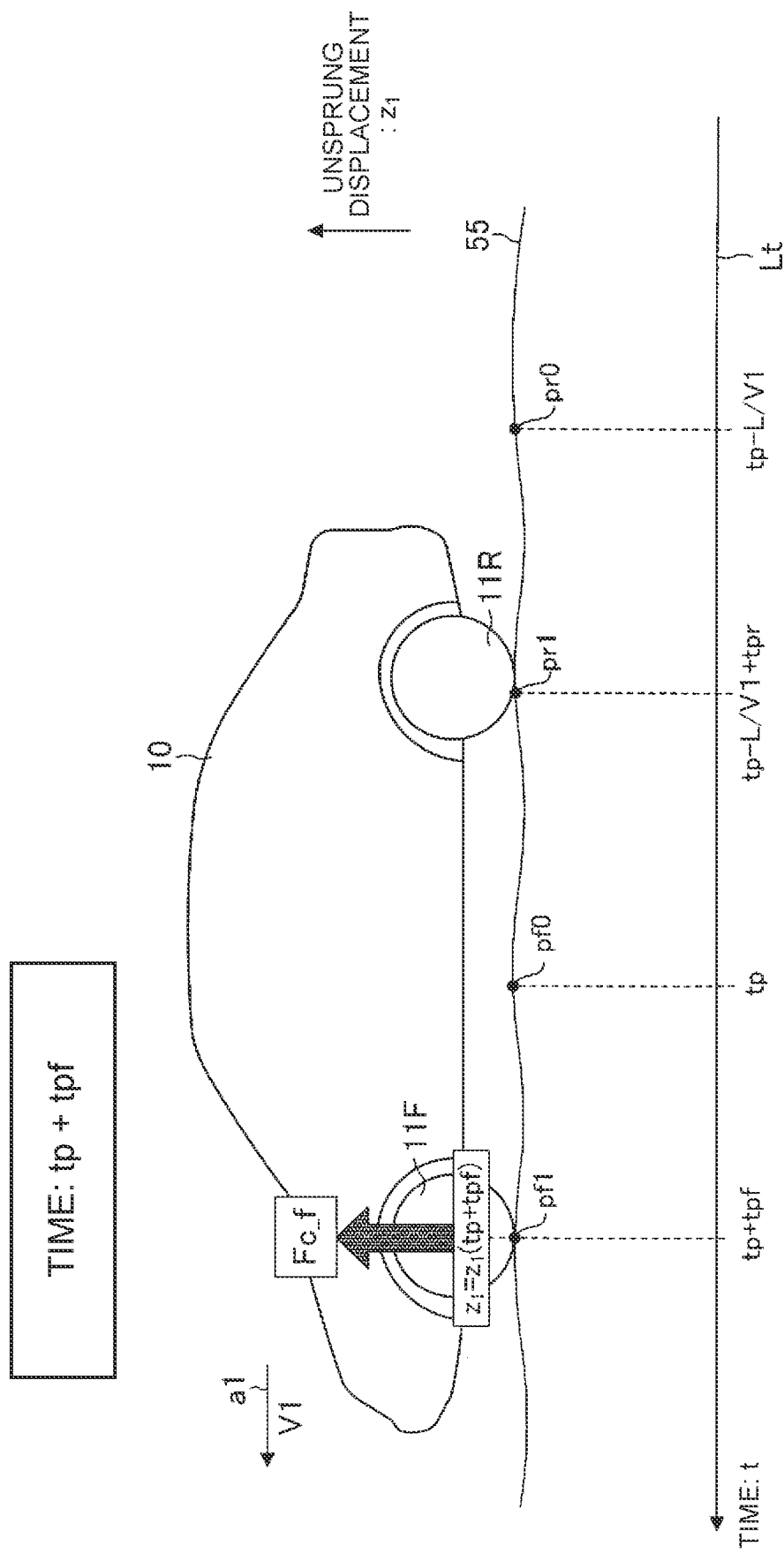
FIG. 5 is a diagram for describing the preview damping control.

As illustrated in FIG. 5, the front wheel active actuator 17F generates the control force Fc_f corresponding to the target control force Fct_f at "time tp+tpf" (that is, at a timing when the front wheel 11F actually passes through the predicted passing position pf1) later than the current time tp by the front wheel preview period tpf. Thus, the front wheel active actuator 17F can generate, at an appropriate timing, the control force Fc_f for reducing the vibration of the sprung portion 51 that occurs due to the unsprung displacement $z_1$ of the front wheel 11F at the predicted passing position pf1.

Preview Damping Control for Rear Wheel 11R

As illustrated in FIG. 4, the ECU 30 determines a predicted passing position pr1 of the rear wheel 11R at a time later (in the future) than the current time tp by a rear wheel preview period tpr. The rear wheel preview period tpr is preset to a period required from the timing when the ECU 30 determines the predicted passing position pr1 to the timing when the rear wheel active actuator 17R outputs a control force Fc_r corresponding to a target control force Fct_r. If the front wheel active actuator 17F and the rear wheel active actuator 17R have different responses, the front wheel preview period tpf and the rear wheel preview period tpr are preset to different values. If the front wheel active actuator 17F and the rear wheel active actuator 17R have the same response, the front wheel preview period tpf and the rear wheel preview period tpr are preset to the same value.

The ECU 30 determines, as the predicted passing position pr1, a position spaced away from the position pr0 at the current time tp by a rear wheel preview distance $L_{pr}$(=V1× tpr) along a predicted path of the rear wheel 11R under the assumption that the rear wheel 11R moves along the same path as that of the front wheel 11F. As described later in detail, the position pr0 is calculated based on the current position of the vehicle 10 that is acquired by the positional information acquiring device 31. An unsprung displacement $z_1$ at the predicted passing position pr1 can be represented by $z_1$(tp−L/V1+tpr) because this unsprung displacement $z_1$ occurs at a time later than "time (tp−L/V1) when front wheel 11F was located at position pr0 of rear wheel 11R at current time" by the rear wheel preview period tpr. The ECU 30 acquires the unsprung displacement $z_1$(tp−L/V1+tpr) based on the determined predicted passing position pr1 and the part of the preview reference data 45 acquired in advance.

The ECU 30 calculates a target control force Fct_r of the rear wheel 11R by applying the unsprung displacement $z_1$(tp−L/V1+tpr) to the unsprung displacement $z_1$ in Expression (9). The symbol "αr" represents a gain for the rear wheel 11R. The symbol "Kr" represents a spring rate of the right rear wheel suspension 13RR and the left rear wheel suspension 13RL. In this example, the gain of in Expression (8) and the gain αr in Expression (9) are set to different values. The spring rate Kf of the right front wheel suspension 13FR and the left front wheel suspension 13FL and the spring rate Kr of the right rear wheel suspension 13RR and the left rear wheel suspension 13RL differ from each other as well.

$$Fct\_r = \alpha r \cdot Kr \cdot z_1 \quad (9)$$

The ECU 30 transmits a control command containing the target control force Fct_r to the rear wheel active actuator 17R to cause the rear wheel active actuator 17R to generate a control force Fc_r that corresponds to (agrees with) the target control force Fct_r.

Figure 6:
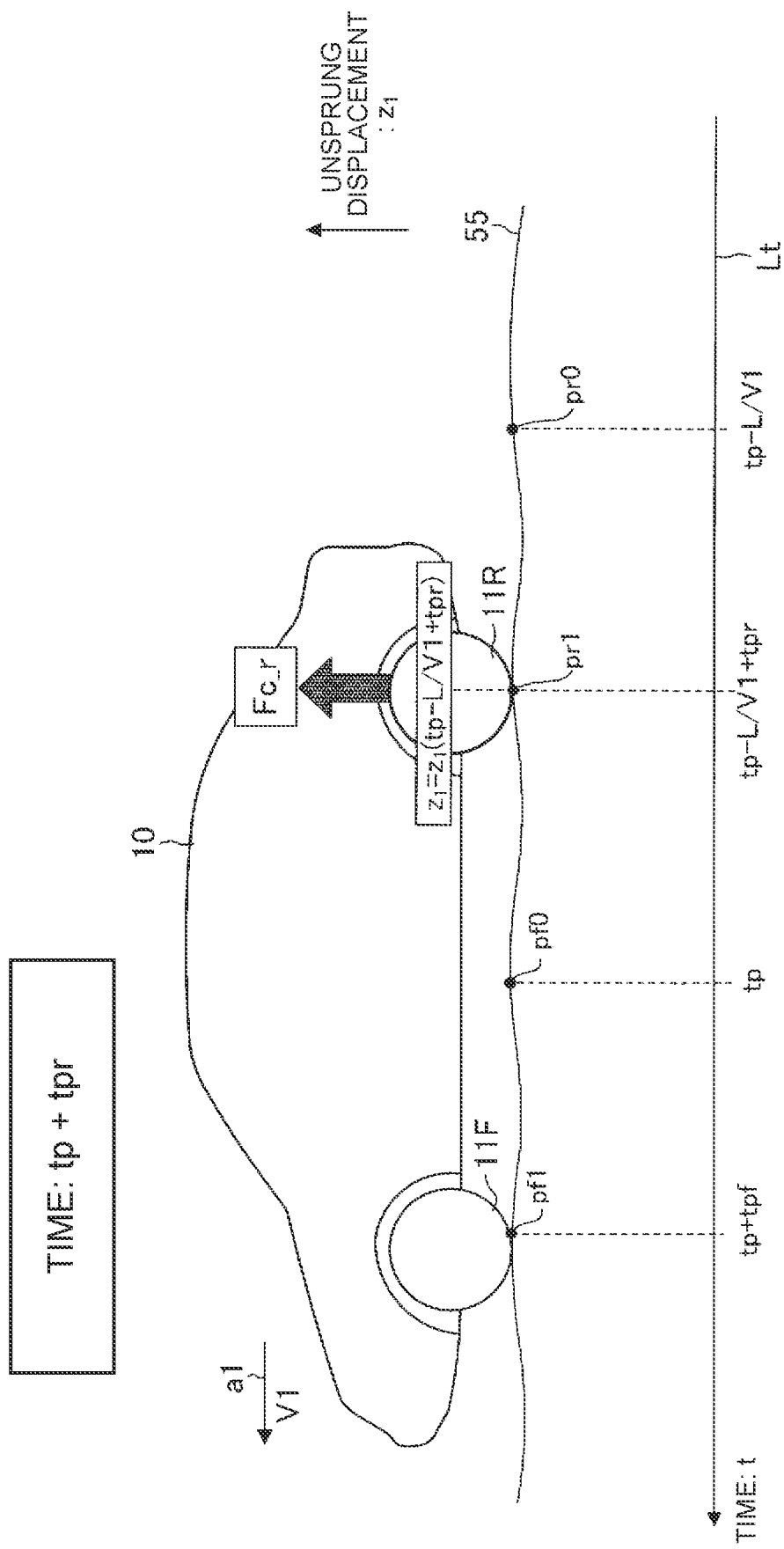
FIG. 6 is a diagram for describing the preview damping control.

As illustrated in FIG. 6, the rear wheel active actuator 17R generates the control force Fc_r corresponding to the target control force Fct_r at "time tp+tpr" (that is, at a timing when the rear wheel 11R actually passes through the predicted passing position pr1) later than the current time tp by the rear wheel preview period tpr. Thus, the rear wheel active actuator 17R can generate, at an appropriate timing, the control force Fc_r for reducing the vibration of the sprung portion 51 that occurs due to the unsprung displacement $z_1$ of the rear wheel 11R at the predicted passing position pr1.

First Embodiment

Figure 7:
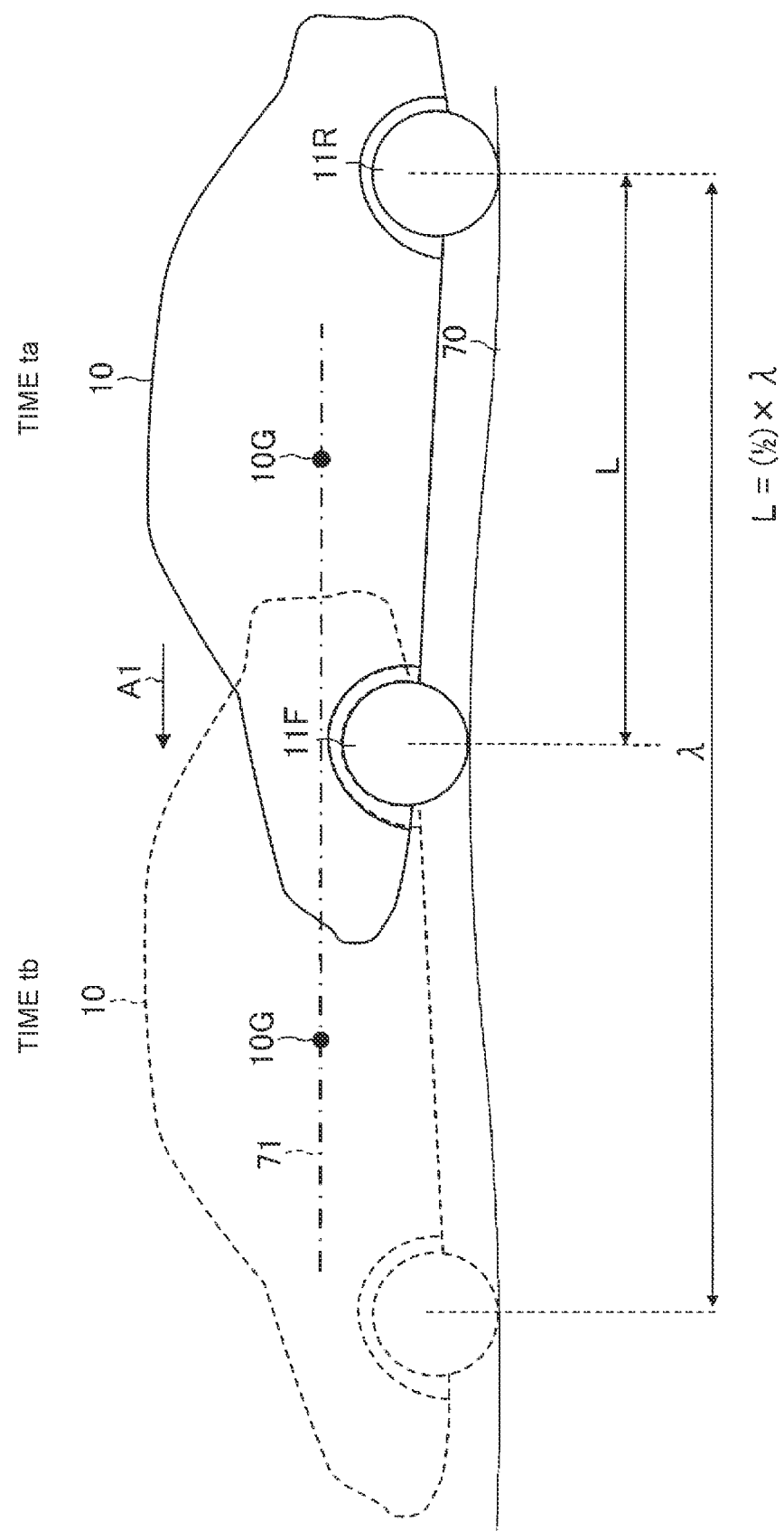
FIG. 7 is a diagram for describing a situation in which the vehicle travels along a road having repetitive undulations.

As illustrated in FIG. 7, it is assumed that the vehicle 10 travels along a road 70 having repetitive undulations. In this example, an amplitude A of a waveform of a road surface displacement of the road 70 is constant. A wheelbase L of the vehicle 10 agrees with a half of a wavelength λ of the waveform of the road surface displacement.

In FIG. 7, the vehicle 10 at a certain time ta is indicated by continuous lines. At the time ta, the front wheel 11F is in contact with a convex road surface, and the contact point of the front wheel 11F is located at a peak (the highest point) of the waveform of the road surface displacement. The rear wheel 11R is in contact with a concave road surface, and the contact point of the rear wheel 11R is located at a valley (the lowest point) of the waveform of the road surface displacement. In this case, the ECU 30 controls the front wheel active actuator 17F in a downward direction and the rear wheel active actuator 17R in an upward direction.

In FIG. 7, the vehicle 10 at a time tb later than the time ta by a half period is indicated by dashed lines. At the time tb, the front wheel 11F is in contact with a concave road surface, and the contact point of the front wheel 11F is located at a valley of the waveform of the road surface displacement. The rear wheel 11R is in contact with a convex road surface, and the contact point of the rear wheel 11R is located at a peak of the waveform of the road surface displacement (point where the front wheel 11F was located at the time ta). In this case, the ECU 30 controls the front wheel active actuator 17F in an upward direction and the rear wheel active actuator 17R in a downward direction.

In this situation, no vertical displacement occurs at a center-of-gravity position 10G of the vehicle 10 as indicated by a long dashed short dashed line 71. When the front wheel active actuator 17F and the rear wheel active actuator 17R are controlled based on pieces of road surface displacement related information in the situation of FIG. 7, the active actuators 17 are driven unnecessarily. Therefore, a problem arises in that unnecessary energy is consumed in the active actuators 17.

In view of the above, the ECU 30 calculates a combined control force Fcta by adding together the target control force Fct_f for the front wheel 11F and the target control force Fct_r for the rear wheel 11R, and calculates a final target control force Fct_f' for the front wheel 11F and a final target control force Fct_r' for the rear wheel 11R by distributing the combined control force Fcta at a predetermined distribution ratio.

Specifically, the ECU 30 calculates the target control force Fct_f for the front wheel 11F by applying road surface displacement related information ($z_1$) at the predicted passing position pf1 of the front wheel 11F to Expression (8). The target control force Fct_f is hereinafter referred to as "first control force Fct_f". The ECU 30 calculates the target control force Fct_r for the rear wheel 11R by applying road surface displacement related information ($z_1$) at the predicted passing position pr1 of the rear wheel 11R to Expression (9). The target control force Fct_r is hereinafter referred to as "second control force Fct_r".

The ECU 30 calculates the combined control force Fcta based on Expression (10). The combined control force Fcta is a value obtained by adding together the first control force Fct_f and the second control force Fct_r.

$$Fcta = Fct\_f + Fct\_r \quad (10)$$

The ECU 30 sets, as the final target control force Fct_f' of the front wheel 11F, a value obtained by multiplying the combined control force Fcta by a first ratio Ra (<1). The target control force Fct_f' is hereinafter referred to as "first final target control force Fct_f'". The ECU 30 sets, as the final target control force Fct_r' of the rear wheel 11R, a value obtained by multiplying the combined control force Fcta by a second ratio Rb (<1). The target control force Fct_r' is hereinafter referred to as "second final target control force Fct_r'".

The first ratio Ra and the second ratio Rb have a relationship represented by Expression (11).

$$Rb = 1 - Ra \quad (11)$$

In this example, the performance of the front wheel active actuator 17F is higher than the performance of the rear wheel active actuator 17R. The performance of the active actuator herein includes output performance (magnitude of an output of the control force) and/or response performance (speed of an output of the control force relative to an input of the control command). In this example, the first ratio Ra is higher than the second ratio Rb (Ra>Rb).

If the performance of the front wheel active actuator 17F is equal to the performance of the rear wheel active actuator 17R, the first ratio Ra and the second ratio Rb may be set to the same value (that is, 0.5).

The configuration described above attains the following effects. At the time to in FIG. 7, the road surface at the front wheel 11F is convex, and therefore the first control force Fct_f is a downward control force. The road surface at the rear wheel 11R is concave, and therefore the second control force Fct_r is an upward control force. In this situation, the ECU 30 calculates the combined control force Fcta by adding together the first control force Fct_f and the second control force Fct_r. The upward control force and the downward control force are canceled out, and as a result, the magnitude of the combined control force Fcta decreases. The ECU 30 distributes the combined control force Fcta to the front wheel 11F and the rear wheel 11R at the predetermined distribution ratio. Also at the time tb, the ECU 30 executes the same process. The upward control force and the downward control force are canceled out, and as a result, the magnitude of the combined control force Fcta decreases. Through this control, the possibility of unnecessary driving of the active actuators 17 can be reduced in the situation in which the center-of-gravity position 10G of the vehicle 10 is not displaced in the vertical direction. The possibility of unnecessary energy consumption in the active actuators 17 can be reduced.

The first ratio Ra is higher than the second ratio Rb. A greater control force is distributed to the high-performance front wheel active actuator 17F. The vibration of the sprung portion 51 can be reduced more effectively when the front wheel active actuator 17F is driven.

Damping Control Routine

The CPU of the ECU 30 ("CPU" hereinafter refers to the CPU of the ECU 30 unless otherwise noted) executes a damping control routine illustrated in a flowchart of FIG. 8 every time a predetermined period has elapsed. The CPU executes the damping control routine for each of the right wheels (11FR and 11RR) and the left wheels (11FL and 11RL).

The CPU executes a routine (not illustrated) every time a predetermined period has elapsed to acquire in advance preview reference data 45 in a preparatory $z_0$ ne from the cloud 40 and temporarily store the preview reference data 45 in the RAM. The preparatory $z_0$ ne has a start point at a front wheel predicted passing position pf1 when the vehicle 10 reaches the end point of a previous preparatory $z_0$ ne, and has an end point at a position spaced away from the front wheel predicted passing position pf1 by a predetermined preparatory distance along a traveling direction Td of the vehicle 10. The preparatory distance is preset to a value sufficiently larger than the front wheel preview distance $L_{pf}$.

Figure 8:
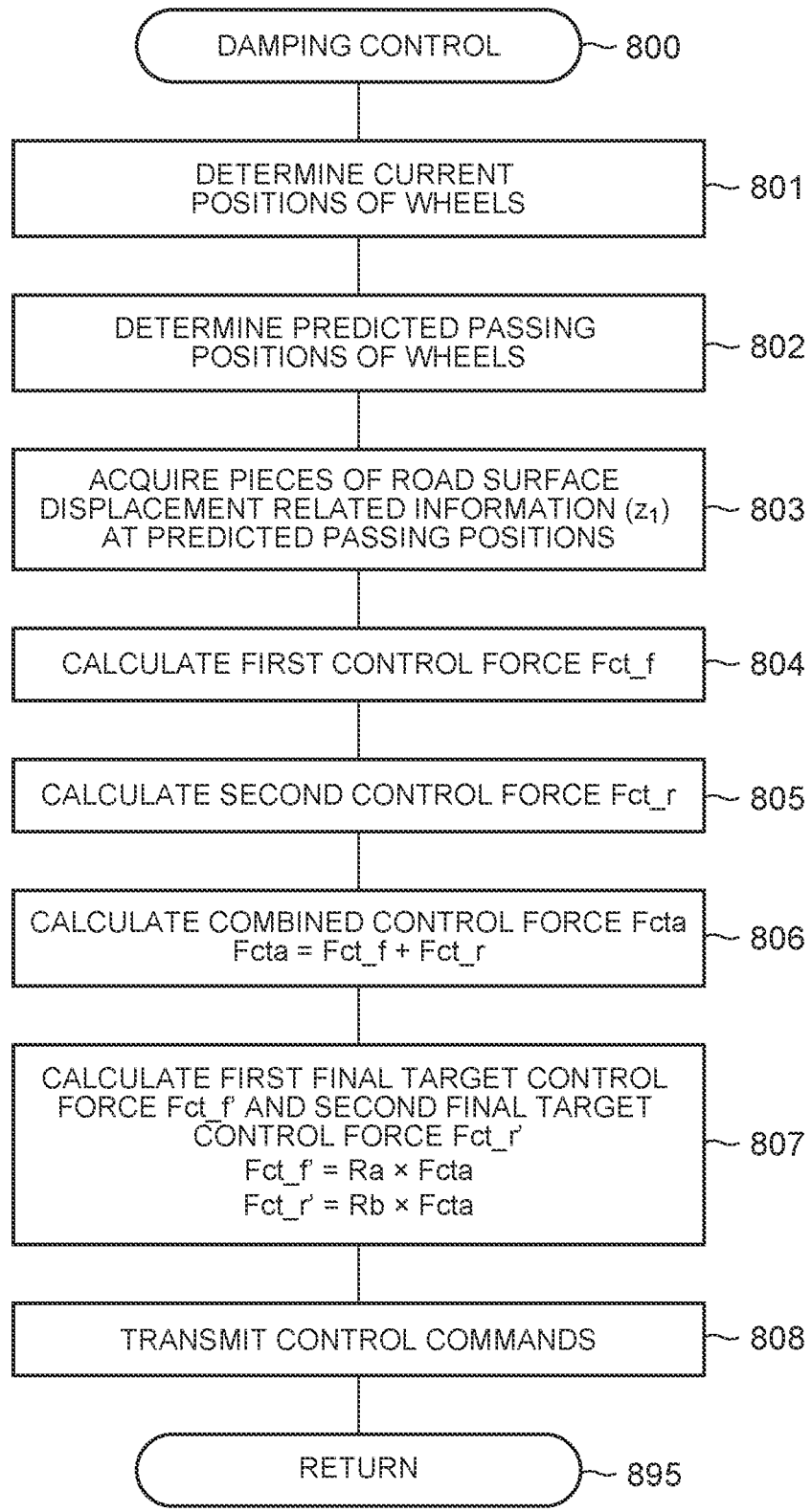
FIG. 8 is a flowchart illustrating a routine to be executed by a central processing unit (CPU) of an electronic control unit according to a first embodiment.

At a predetermined timing, the CPU starts a process from Step 800 of FIG. 8, and executes Step 801 to Step 808 in this order. Then, the CPU proceeds to Step 895 to temporarily terminate this routine.

Step 801: The CPU determines current positions of the wheels 11.

More specifically, the CPU determines (acquires) a current position of the vehicle 10, a vehicle speed V1, and a traveling direction Td of the vehicle 10 from the positional information acquiring device 31. The ROM of the ECU 30 prestores positional relationship data indicating relationships between a mounting position of the GNSS receiver in the vehicle 10 and the positions of the wheels 11. The current position of the vehicle 10 that is acquired from the positional information acquiring device 31 corresponds to the mounting position of the GNSS receiver. Therefore, the CPU determines the current positions of the wheels 11 by referring to the current position of the vehicle 10, the traveling direction Td of the vehicle 10, and the positional relationship data.

Step 802: The CPU determines predicted passing positions of the wheels 11 as follows.

The CPU determines a predicted path of the front wheel 11F and a predicted path of the rear wheel 11R. As described above, the predicted path of the front wheel 11F is a path where the front wheel 11F is predicted to move in the future, and the predicted path of the rear wheel 11R is a path where the rear wheel 11R is predicted to move in the future. For example, the CPU determines the predicted path of the front wheel 11F based on the current positions of the wheels 11, the traveling direction Td of the vehicle 10, and the positional relationship data. For example, the CPU determines the predicted path of the rear wheel 11R under the assumption that the rear wheel 11R moves along the same path as that of the front wheel 11F.

As described above, the CPU calculates a front wheel preview distance $L_{pf}$ by multiplying the vehicle speed V1 by the front wheel preview period tpf. The CPU determines, as a front wheel predicted passing position pf1, a position of the front wheel 11F that advances from its current position by the front wheel preview distance $L_{pf}$ along the predicted path of the front wheel 11F.

The CPU calculates a rear wheel preview distance $L_{pr}$ by multiplying the vehicle speed V1 by the rear wheel preview period tpr. The CPU determines, as a rear wheel predicted passing position pr1, a position of the rear wheel 11R that advances from its current position by the rear wheel preview distance $L_{pr}$ along the predicted path of the rear wheel 11R.

Step 803: The CPU acquires road surface displacement related information ($z_1$) at the front wheel predicted passing position pf1 and road surface displacement related information ($z_1$) at the rear wheel predicted passing position pr1 from the RAM.

Step 804: The CPU calculates a first control force Fct_f based on Expression (8) by using the road surface displacement related information ($z_1$) at the front wheel predicted passing position pf1.

Step 805: The CPU calculates a second control force Fct_r based on Expression (9) by using the road surface displacement related information ($z_1$) at the rear wheel predicted passing position pr1.

Step 806: The CPU calculates a combined control force Fcta based on Expression (10).

Step 807: The CPU calculates a first final target control force Fct_f' for the front wheel 11F based on Expression (12). The CPU calculates a second final target control force Fct_r' for the rear wheel 11R based on Expression (13). Relationships of "Ra<1" and "Rb=1−Ra" hold.

$$Fct\_f' = Ra \times Fcta \quad (12)$$

$$Fct\_r' = Rb \times Fcta \quad (13)$$

Step 808: The CPU transmits a control command containing the first final target control force Fct_f' to the front wheel active actuator 17F. Thus, the CPU controls the front wheel active actuator 17F such that the front wheel active actuator 17F generates a control force Fc_f that agrees with the first final target control force Fct_f' in the front wheel 11F at a timing when the front wheel 11F passes through the predicted passing position pf1. The CPU transmits a control command containing the second final target control force Fct_r' to the rear wheel active actuator 17R. Thus, the CPU controls the rear wheel active actuator 17R such that the rear wheel active actuator 17R generates a control force Fc_r that agrees with the second final target control force Fct_r' in the rear wheel 11R at a timing when the rear wheel 11R passes through the predicted passing position pr1.

As understood from the above, the damping control device 20 can reduce the possibility of unnecessary driving of the active actuators 17 in the situation in which the center-of-gravity position 10G of the vehicle 10 is not displaced in the vertical direction. Thus, the possibility of unnecessary energy consumption in the active actuators 17 can be reduced.

To clearly describe the effects of this embodiment, FIG. 7 illustrates the example in which the wheelbase L of the vehicle 10 completely agrees with the half of the wavelength λ of the waveform of the road surface displacement. The configuration of this embodiment attains the effects also in situations other than that in the example of FIG. 7. For example, the upward control force and the downward control force are canceled out also in a situation in which the wheelbase L of the vehicle 10 does not completely agree with the half of the wavelength of the waveform of the road surface displacement. Therefore, the possibility of unnecessary driving of the active actuators 17 can be reduced. Thus, the possibility of unnecessary energy consumption in the active actuators 17 can be reduced as compared to the related-art device.

Second Embodiment

Next, damping control for the front wheels and the rear wheels according to a second embodiment is described with reference to FIG. 9 and FIG. 10. In the following description, a suffix "_f" corresponds to the front wheels 11F, and a suffix "_r" corresponds to the rear wheels 11R. A suffix "_fr" corresponds to the right front wheel 11FR, a suffix "_fl" corresponds to the left front wheel 11FL, a suffix "_rr" corresponds to the right rear wheel 11RR, and a suffix "_rl" corresponds to the left rear wheel 11RL.

Figure 9:
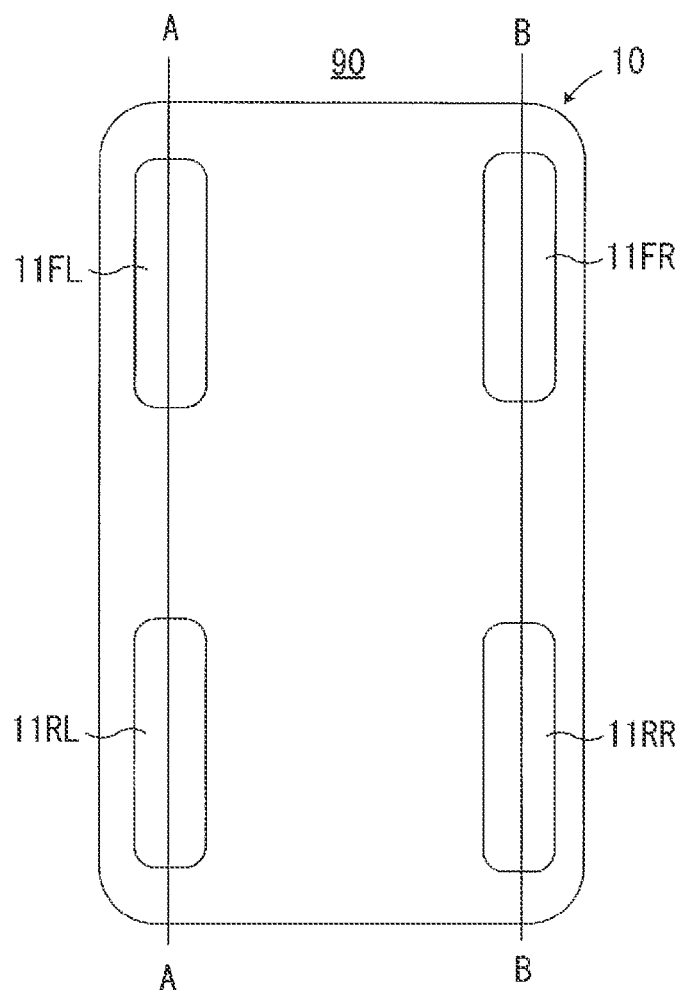
FIG. 9 is a diagram for describing a situation in which a waveform of a road surface displacement on a right side of the vehicle and a waveform of a road surface displacement on a left side of the vehicle have opposite phases.

As illustrated in FIG. 9, it is assumed that the vehicle 10 travels along a road 90 having irregularities. In this example, amplitudes A of waveforms of road surface displacements of the road 90 are equal on the right and left sides of the vehicle 10.

Figure 10:
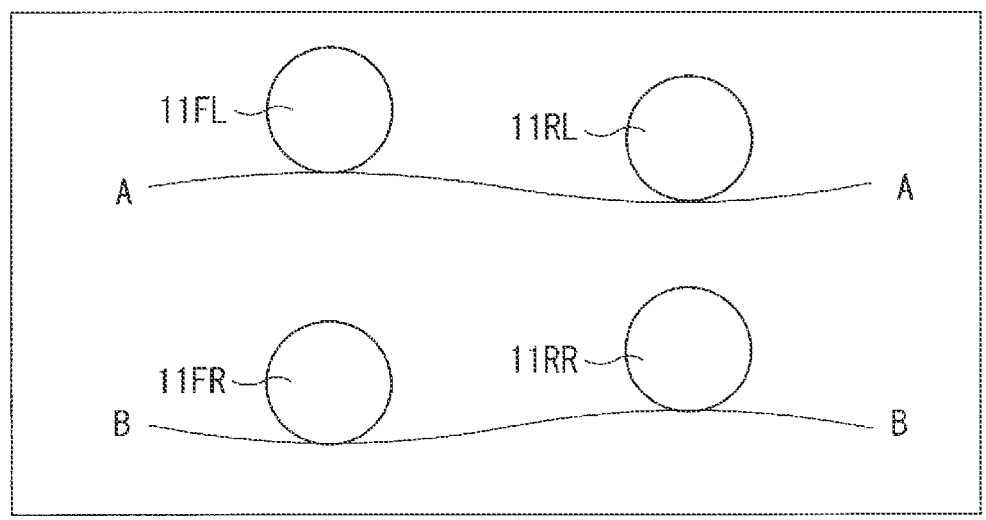
FIG. 10 is a diagram illustrating cross sections taken along lines A-A and B-B in FIG. 9.

As illustrated in FIG. 10, the right front wheel 11FR is in contact with a concave road surface, and the contact point of the right front wheel 11FR is located at a valley (the lowest point) of the waveform of the road surface displacement. The right rear wheel 11RR is in contact with a convex road surface, and the contact point of the right rear wheel 11RR is located at a peak (the highest point) of the waveform of the road surface displacement. The left front wheel 11FL is in contact with a convex road surface, and the contact point of the left front wheel 11FL is located at a peak of the waveform of the road surface displacement. The left rear wheel 11RL is in contact with a concave road surface, and the contact point of the left rear wheel 11RL is located at a valley of the waveform of the road surface displacement. Thus, the waveform of the road surface displacement on the right side of the vehicle 10 and the waveform of the road surface displacement on the left side of the vehicle 10 have opposite phases.

In the situation illustrated in FIG. 9 and FIG. 10, no roll displacement occurs in the vehicle 10. When the active actuators 17 are controlled based on pieces of road surface displacement related information in this situation, the active actuators 17 are driven unnecessarily. Therefore, a problem arises in that unnecessary energy is consumed in the active actuators 17.

The "situation in which waveform of road surface displacement on right side of vehicle 10 and waveform of road surface displacement on left side of vehicle 10 have opposite phases" as illustrated in FIG. 9 and FIG. 10 is hereinafter referred to as "first situation". The "situation in which waveform of road surface displacement on right side of vehicle 10 and waveform of road surface displacement on left side of vehicle 10 have identical phases" is hereinafter referred to as "second situation".

In view of the above, the ECU 30 of this embodiment calculates control forces adapted to the first situation and control forces adapted to the second situation by using road surface displacement related information of the right front wheel 11FR, road surface displacement related information of the right rear wheel 11RR, road surface displacement related information of the left front wheel 11FL, and road surface displacement related information of the left rear wheel 11RL. The ECU 30 calculates final target control forces for the right and left front wheels 11 and the right and left rear wheels 11 ("Fct_fr'", "Fct_rr'", "Fct_fl'", and "Fct_rl'" described later) by using the control forces.

Specifically, the ECU 30 determines predicted passing positions of the wheels 11 as follows. The ECU 30 determines a predicted path of the right front wheel 11FR and a predicted path of the left front wheel 11FL. As described above, the predicted path of the right front wheel 11FR is a path where the right front wheel 11FR is predicted to move in the future, and the predicted path of the left front wheel 11FL is a path where the left front wheel 11FL is predicted to move in the future. For example, the ECU 30 determines the predicted path of the right front wheel 11FR and the predicted path of the left front wheel 11FL based on current positions of the wheels 11, a traveling direction Td of the vehicle 10, and the positional relationship data. The ECU 30 determines a predicted path of the right rear wheel 11RR under the assumption that the right rear wheel 11RR moves along the same path as that of the right front wheel 11FR. The ECU 30 determines a predicted path of the left rear wheel 11RL under the assumption that the left rear wheel 11RL moves along the same path as that of the left front wheel 11FL.

The ECU 30 determines, as a predicted passing position pfr1 of the right front wheel 11FR, a position of the right front wheel 11FR that advances from its current position by a front wheel preview distance $L_{pf}$ along the predicted path of the right front wheel 11FR. The ECU 30 determines, as a predicted passing position pfl1 of the left front wheel 11FL, a position of the left front wheel 11FL that advances from its current position by the front wheel preview distance $L_{pf}$ along the predicted path of the left front wheel 11FL.

The ECU 30 determines, as a predicted passing position prr1 of the right rear wheel 11RR, a position of the right rear wheel 11RR that advances from its current position by a rear wheel preview distance $L_{pr}$ along the predicted path of the right rear wheel 11RR. The ECU 30 determines, as a predicted passing position prl1 of the left rear wheel 11RL, a position of the left rear wheel 11RL that advances from its current position by the rear wheel preview distance $L_{pr}$ along the predicted path of the left rear wheel 11RL.

The ECU 30 acquires road surface displacement related information ($z_1\_fr$) at the predicted passing position pfr1 of the right front wheel 11FR, road surface displacement related information ($z_1\_fl$) at the predicted passing position pfl1 of the left front wheel 11FL, road surface displacement related information ($z_1\_rr$) at the predicted passing position prr1 of the right rear wheel 11RR, and road surface displacement related information ($z_1\_rl$) at the predicted passing position prl1 of the left rear wheel 11RL. In this example, each piece of road surface displacement related information is an unsprung displacement $z_1$.

The road surface displacement related information may include at least one of a road surface displacement $z_0$, a road surface displacement speed $dz_0$, the unsprung displacement $z_1$, and an unsprung speed $dz_1$.

In the following description, various control forces are calculated by using the unsprung displacements $z_1$ (that is, based on Expression (7)). However, the calculation of the control forces is not limited to that in this example. For example, each control force may be calculated by using the unsprung displacement $z_1$ and the unsprung speed $dz_1$ (for example, based on Expression (6)). As described above, each control force may be calculated by using the road surface displacement $z_0$ and/or the road surface displacement speed $dz_0$ in place of or in addition to the unsprung displacement $z_1$ and the unsprung speed $dz_1$.

The ECU 30 calculates a control force Fcd adapted to the first situation based on Expression (14). The control force Fcd is hereinafter referred to as "first-situation control force Fcd". In Expression (14), $K1\_f$ represents a spring rate of the right front wheel suspension 13FR and the left front wheel suspension 13FL, and $K1\_r$ represents a spring rate of the right rear wheel suspension 13RR and the left rear wheel suspension 13RL. The spring rates $K1\_f$ and $K1\_r$ differ from each other.

$$Fcd=(z_1\_fl-z_1\_fr)K1\_f+(z_1\_rl-z_1\_rr)K1\_r \tag{14}$$

The ECU 30 calculates a control force Fan_f for the right and left front wheels 11FR and 11FL adapted to the first situation and a control force Fan_r for the right and left rear wheels 11RR and 11RL adapted to the first situation by distributing the first-situation control force Fcd at a predetermined distribution ratio. The control force Fan_f is hereinafter referred to as "first front wheel control force Fan_f". The control force Fan_r is hereinafter referred to as "first rear wheel control force Fan_r".

Specifically, the ECU 30 calculates the first front wheel control force Fan_f based on Expression (15). The ECU 30 calculates the first rear wheel control force Fan_r based on Expression (16). The symbols "$\alpha an\_f$" and "$\alpha an\_r$" represent gains. The sum of $\alpha an\_f$ and $\alpha an\_r$ is a predetermined value $\alpha an$ (that is, $\alpha an\_f+\alpha an\_r=\alpha an$).

$$Fan\_f=\alpha an\_f \times Fcd \tag{15}$$

$$Fan\_r=\alpha an\_r \times Fcd \tag{16}$$

In this example, the performance of each front wheel active actuator 17F is higher than the performance of each rear wheel active actuator 17R. In this case, $\alpha an\_f$ is larger than $\alpha an\_r$ ($\alpha an\_f>\alpha an\_r$). If the performance of each front wheel active actuator 17F is equal to the performance of each rear wheel active actuator 17R, $\alpha an\_f$ and $\alpha an\_r$ may be set to the same value.

In Expression (14), the first term on the right-hand side represents a control force adapted to a situation in which the waveform of the road surface displacement at the right front wheel 11FR and the waveform of the road surface displacement at the left front wheel 11FL have opposite phases. In other words, the first term on the right-hand side is a value obtained by multiplying components of the road surface displacements in opposite phases at the front wheels 11F by the spring rate $K1\_f$. The second term on the right-hand side represents a control force adapted to a situation in which the waveform of the road surface displacement at the right rear wheel 11RR and the waveform of the road surface displacement at the left rear wheel 11RL have opposite phases. In other words, the second term on the right-hand side is a value obtained by multiplying components of the road surface displacements in opposite phases at the rear wheels 11R by the spring rate $K1\_r$. Since the first-situation control force Fcd is a value obtained by adding together the first term and the second term, the value of the first term and the value of the second term are canceled out in, for example, the situation illustrated in FIG. 9 and FIG. 10. As a result, the first-situation control force Fcd decreases. That is, the possibility of unnecessary driving of the active actuators 17 can be reduced in the situation in which no roll displacement occurs. Thus, the possibility of unnecessary energy consumption in the active actuators 17 can be reduced.

The gain $\alpha an\_f$ is larger than the gain $\alpha an\_r$. Greater control forces are distributed to the high-performance front wheel active actuators 17F. Thus, the vibration of the sprung portion 51 can be reduced more effectively when the active actuators 17 are driven.

The ECU 30 calculates a control force Fin_f for the right and left front wheels 11FR and 11FL adapted to the second situation based on Expression (17). The ECU 30 calculates a control force Fin_r for the right and left rear wheels 11RR and 11RL adapted to the second situation based on Expression (18). The control force Fin_f is hereinafter referred to as "second front wheel control force Fin_f". The control force Fin_r is hereinafter referred to as "second rear wheel control force Fin_r".

$$Fin\_f=\alpha in\_f(z_1\_fl+z_1\_fr)K2\_f \tag{17}$$

$$Fin\_r=\alpha in\_r(z_1\_rl+z_1\_rr)K2\_r \tag{18}$$

The symbols "αin_f" and "αin_r" represent gains. Since the performance of each front wheel active actuator 17F is higher than the performance of each rear wheel active actuator 17R, αin_f is larger than αin_r (αin_f>αin_r). If the performance of each front wheel active actuator 17F is equal to the performance of each rear wheel active actuator 17R, αin_f and αin_r may be set to the same value.

The symbol "K2_f" represents a spring rate of the right front wheel suspension 13FR and the left front wheel suspension 13FL. The symbol "K2_r" represents a spring rate of the right rear wheel suspension 13RR and the left rear wheel suspension 13RL. The spring rates K2_f and K2_r differ from each other. The spring rates applied to the first situation differ from the spring rates applied to the second situation. Thus, K1_f in Expression (14) differs from K2_f in Expression (17), and K1_r in Expression (14) differs from K2_r in Expression (18).

The second front wheel control force Fin_f is a control force adapted to a situation in which the waveform of the road surface displacement at the right front wheel 11FR and the waveform of the road surface displacement at the left front wheel 11FL have identical phases. In other words, the second front wheel control force Fin_f is a value obtained by multiplying components of the road surface displacements in identical phases at the front wheels 11F by the spring rate K2_f and the gain αin_f. The second rear wheel control force Fin_r is a control force adapted to a situation in which the waveform of the road surface displacement at the right rear wheel 11RR and the waveform of the road surface displacement at the left rear wheel 11RL have identical phases. In other words, the second rear wheel control force Fin_r is a value obtained by multiplying components of the road surface displacements in identical phases at the rear wheels 11R by the spring rate K2_r and the gain αin_r.

The ECU 30 calculates a final target control force Fct_fl' of the left front wheel 11FL based on Expression (19). The ECU 30 calculates a final target control force Fct_fr' of the right front wheel 11FR based on Expression (20). The ECU 30 calculates a final target control force Fct_rl' of the left rear wheel 11RL based on Expression (21). The ECU 30 calculates a final target control force Fct_rr' of the right rear wheel 11RR based on Expression (22). The target control force Fct_fl' is hereinafter referred to as "first final target control force Fct_fl'". The target control force Fct_fr' is hereinafter referred to as "second final target control force Fct_fr'". The target control force Fct_rl' is hereinafter referred to as "third final target control force Fct_rl'". The target control force Fct_rr' is hereinafter referred to as "fourth final target control force Fct_rr'".

$$Fct\_fl'=(Fin\_f+Fan\_f)/2 \quad (19)$$

$$Fct\_fr'=(Fin\_f-Fan\_f)/2 \quad (20)$$

$$Fct\_rl'=(Fin\_r+Fan\_r)/2 \quad (21)$$

$$Fct\_rr'=(Fin\_r-Fan\_r)/2 \quad (22)$$

The first final target control force Fct_fl' is a half of the sum of the second front wheel control force Fin_f and the first front wheel control force Fan_f. The second final target control force Fct_fr' is a half of a difference between the second front wheel control force Fin_f and the first front wheel control force Fan_f. The third final target control force Fct_rl' is a half of the sum of the second rear wheel control force Fin_r and the first rear wheel control force Fan_r. The fourth final target control force Fct_rr' is a half of a difference between the second rear wheel control force Fin_r and the first rear wheel control force Fan_r. Therefore, a predetermined proportion (½ in this example) of the sum of the control force adapted to the first situation and the control force adapted to the second situation (Fan_f+Fin_f or Fan_r+Fin_r) and a predetermined proportion (½ in this example) of the difference between the control force adapted to the first situation and the control force adapted to the second situation (Fan_f−Fin_f or Fan_r−Fin_r) are distributed to the right and left front wheels 11F and to the right and left rear wheels 11R. According to this configuration, the active actuators 17 of the right and left front and rear wheels 11FR to 11RL can be controlled by appropriate control forces in consideration of both the components of the road surface displacements in opposite phases and the components of the road surface displacements in identical phases.

Damping Control Routine

The CPU of the ECU 30 executes a damping control routine illustrated in FIG. 11 in place of the flowchart of FIG. 8 every time a predetermined period has elapsed.

At a predetermined timing, the CPU starts a process from Step 1100 of FIG. 11, and executes Step 1101 to Step 1107 in this order. Then, the CPU proceeds to Step 1195 to temporarily terminate this routine.

Step 1101: The CPU determines current positions of the wheels 11.

Step 1102: The CPU determines predicted passing positions of the wheels 11 as described above.

Step 1103: The CPU acquires, from the RAM, road surface displacement related information ($z_1\_fr$) at the predicted passing position pfr1 of the right front wheel 11FR, road surface displacement related information ($z_1\_fl$) at the predicted passing position pfl1 of the left front wheel 11FL, road surface displacement related information ($z_1\_rr$) at the predicted passing position prr1 of the right rear wheel 11RR, and road surface displacement related information ($z_1\_rl$) at the predicted passing position prl1 of the left rear wheel 11RL.

Step 1104: The CPU calculates a first-situation control force Fcd based on Expression (14). The CPU calculates a first front wheel control force Fan_f based on Expression (15) and a first rear wheel control force Fan_r based on Expression (16).

Step 1105: The CPU calculates a second front wheel control force Fin_f based on Expression (17) and a second rear wheel control force Fin_r based on Expression (18).

Step 1106: The CPU calculates a first final target control force Fct_fl' based on Expression (19), a second final target control force Fct_fr' based on Expression (20), a third final target control force Fct_rl' based on Expression (21), and a fourth final target control force Fct_rr' based on Expression (22).

Step 1107: The CPU transmits a control command containing the first final target control force Fct_fl' to the left front wheel active actuator 17FL. Thus, the CPU controls the left front wheel active actuator 17FL such that the left front wheel active actuator 17FL generates a control force Fc_fl that agrees with the first final target control force Fct_fl' in the left front wheel 11FL at a timing when the left front wheel 11FL passes through the predicted passing position pfl1.

The CPU transmits a control command containing the second final target control force Fct_fr' to the right front wheel active actuator 17FR. Thus, the CPU controls the right front wheel active actuator 17FR such that the right front wheel active actuator 17FR generates a control force Fc_fr that agrees with the second final target control force Fct_fr' in the right front wheel 11FR at a timing when the right front wheel 11FR passes through the predicted passing position pfr1.

The CPU transmits a control command containing the third final target control force Fct_rl' to the left rear wheel active actuator 17RL. Thus, the CPU controls the left rear wheel active actuator 17RL such that the left rear wheel active actuator 17RL generates a control force Fc_rl that agrees with the third final target control force Fct_rl' in the left rear wheel 11RL at a timing when the left rear wheel 11RL passes through the predicted passing position prl1.

The CPU transmits a control command containing the fourth final target control force Fct_rr' to the right rear wheel active actuator 17RR. Thus, the CPU controls the right rear wheel active actuator 17RR such that the right rear wheel active actuator 17RR generates a control force Fc_rr that agrees with the fourth final target control force Fct_rr' in the right rear wheel 11RR at a timing when the right rear wheel 11RR passes through the predicted passing position prr1.

As understood from the above, the damping control device 20 calculates the final target control forces (Fct_fr', Fct_fl', Fct_rr', and Fct_rl') based on the control force adapted to the first situation (Fan_f or Fan_r) and the control force adapted to the second situation (Fin_f or Fin_r) for the right and left front wheels and the right and left rear wheels. Thus, the possibility of unnecessary driving of the active actuators 17 can be reduced in, for example, the situation in which no roll displacement occurs in the vehicle 10 illustrated in FIG. 9 and FIG. 10. The possibility of unnecessary energy consumption in the active actuators 17 can be reduced.

In actuality, the waveform of the road surface displacement on the right side of the vehicle 10 and the waveform of the road surface displacement on the left side of the vehicle 10 do not completely have opposite phases or identical phases. In many cases, those waveforms include both the components in opposite phases and the components in identical phases. According to the configuration described above, the damping control device 20 can control the active actuators 17 by appropriate control forces in consideration of both the components in opposite phases and the components in identical phases. Thus, the vibration of the sprung portion 51 of the vehicle 10 can be reduced by the appropriate control forces while reducing the possibility of unnecessary driving of the active actuators 17.

The present disclosure is not limited to the embodiments described above, and various modified examples may be adopted within the scope of the present disclosure.

Modified Example 1

The ECU 30 may acquire the unsprung displacement $z_1$(tp+tpf) as follows. First, the ECU 30 transmits the predicted passing position pf1 to the cloud 40. The cloud 40 acquires the unsprung displacement $z_1$(tp+tpf) linked to positional information indicating the predicted passing position pf1 based on the predicted passing position pf1 and the preview reference data 45. The cloud 40 transmits the unsprung displacement $z_1$(tp+tpf) to the ECU 30.

Modified Example 2

The preview reference data 45 need not be stored in the storage device 44 in the cloud 40, but may be stored in the storage device 30a.

Modified Example 3

The road surface displacement related information may be acquired by the preview sensor 33 provided in the vehicle 10. The ECU 30 acquires the road surface displacement related information from the preview sensor 33. For example, the ECU 30 acquires the road surface displacement $z_0$ at the predicted passing position based on the road surface displacement $z_0$ acquired by the preview sensor 33.

Modified Example 4

Pieces of road surface displacement related information detected by various sensors provided on the front wheels 11F may be used as pieces of road surface displacement related information for the preview damping control on the rear wheels 11R. For example, vertical acceleration sensors may be provided on the vehicle body 10a (sprung portion 51) at positions corresponding to the positions of the right front wheel 11FR and the left front wheel 11FL, respectively. Stroke sensors may be provided on the right front wheel suspension 13FR and the left front wheel suspension 13FL, respectively. A sprung acceleration detected by the vertical acceleration sensor provided on the front wheel 11F is hereinafter represented by "$ddz_2\_f$". A stroke detected by the stroke sensor provided on the front wheel 11F is hereinafter represented by "$H\_f$".

The ECU 30 determines a sprung displacement $z_2\_f$ based on the sprung acceleration $ddz_2\_f$, and calculates an unsprung displacement $z_1\_f$ by subtracting the stroke $H\_f$ from the sprung displacement $z_2\_f$. The ECU 30 saves the unsprung displacement $z_1\_f$ in the RAM as an unsprung displacement ahead of the rear wheel 11R by linking the unsprung displacement to information on a position of the front wheel 11F when the sprung acceleration $ddz_2\_f$ is detected. The ECU 30 may calculate various control forces described above by acquiring an unsprung displacement $z_1\_f$ at a rear wheel predicted passing position pr1 from among the unsprung displacements $z_1\_f$ ahead of the rear wheel 11R that are saved in the RAM. In this manner, the vertical acceleration sensors and the stroke sensors provided on the front wheels 11F may function as devices configured to acquire pieces of road surface displacement related information ahead of the right and left rear wheels 11RR and 11RL.

Modified Example 5

The suspensions 13FR to 13RL may be any type of suspension as long as the wheels 11FR to 11RL are allowed to be displaced in the vertical direction relative to the vehicle body 10a. The suspension springs 16FR to 16RL may be arbitrary springs such as compression coil springs or air springs.

Modified Example 6

In the embodiments described above, the active actuator 17 is used as the control force generating device, but the control force generating device is not limited to the active actuator 17. That is, the control force generating device may be an actuator configured to adjustably generate a vertical control force for damping the sprung portion 51 based on a control command containing the target control force.

The control force generating device may be an active stabilizer device (not illustrated). The active stabilizer device includes a front wheel active stabilizer and a rear wheel active stabilizer. When the front wheel active stabilizer generates a vertical control force between the sprung portion 51 and the unsprung portion 50 corresponding to the left front wheel 11FL (left front wheel control force), the front wheel active stabilizer generates a control force in a direction opposite to the direction of the left front wheel control force between the sprung portion 51 and the unsprung portion 50 corresponding to the right front wheel 11FR (right front wheel control force). Similarly, when the rear wheel active stabilizer generates a vertical control force between the sprung portion 51 and the unsprung portion 50 corresponding to the left rear wheel 11RL (left rear wheel control force), the rear wheel active stabilizer generates a control force in a direction opposite to the direction of the left rear wheel control force between the sprung portion 51 and the unsprung portion 50 corresponding to the right rear wheel 11RR (right rear wheel control force). The structure of the active stabilizer device is well known, and is incorporated herein by reference to Japanese Unexamined Patent Application Publication No. 2009-96366 (JP 2009-96366 A). The active stabilizer device may include at least one of the front wheel active stabilizer and the rear wheel active stabilizer.

The control force generating device may be a device configured to generate vertical control forces Fc based on geometry of the suspensions 13FR to 13RL by increasing or reducing braking or driving forces on the wheels 11 of the vehicle 10. The structure of this device is well known, and is incorporated herein by reference to, for example, Japanese Unexamined Patent Application Publication No. 2016-107778 (JP 2016-107778 A). Using a well-known method, the ECU 30 calculates braking or driving forces for generating control forces Fc corresponding to target control forces Fct. The device includes driving devices (for example, in-wheel motors) configured to apply driving forces to the wheels 11, and braking devices (brakes) configured to apply braking forces to the wheels 11. The driving device may be a motor or an engine configured to apply driving forces to the front wheels, the rear wheels, or the four wheels. The control force generating device may include at least one of the driving device and the braking device.

The control force generating device may be each of the adjustable shock absorbers 15FR to 15RL. In this case, the ECU 30 controls the damping coefficients C of the shock absorbers 15FR to 15RL to change damping forces of the shock absorbers 15FR to 15RL by values corresponding to target control forces Fct.

Modified Example 7

Regarding the second embodiment, the ECU 30 may control the control force generating device by using only the first front wheel control force Fan_f and the first rear wheel control force Fan_r. Also in this configuration, the possibility of unnecessary driving of the control force generating device can be reduced in the situation in which no roll displacement occurs in the vehicle 10 illustrated in FIG. 9 and FIG. 10. For example, this configuration may be adopted when the control force generating device is the active stabilizer device.

In this configuration, the ECU 30 calculates the control force Fcd adapted to the first situation based on Expression (14). The ECU 30 calculates the first front wheel control force Fan_f based on Expression (15) and the first rear wheel control force Fan_r based on Expression (16). The ECU 30 converts the first front wheel control force Fan_f into a control amount of the front wheel active stabilizer, and controls the front wheel active stabilizer based on the control amount. The ECU 30 converts the first rear wheel control force Fan_r into a control amount of the rear wheel active stabilizer, and controls the rear wheel active stabilizer based on the control amount.

Modified Example 8

The configurations of the first and second embodiments may be applied to damping control for generating control forces for the right and left front and rear wheels based on pieces of road surface displacement related information acquired by using, for example, "vertical acceleration sensors (sprung acceleration sensors) and stroke sensors" provided on the right and left front and rear wheels. Further, the configurations of the first and second embodiments may be applied to feedback damping control (skyhook control) for generating control forces for the right and left front and rear wheels based on pieces of information acquired by using vertical acceleration sensors (sprung acceleration sensors) provided on the right and left front and rear wheels.

What is claimed is:
1. A damping control device for a vehicle having wheels including a front wheel and a rear wheel, the damping control device comprising:
a control force generating device configured to generate a vertical control force for damping a sprung portion of the vehicle between each of the wheels and a portion of a vehicle body that corresponds to a position of each of the wheels;
an information acquirer configured to acquire pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements that are the vertical displacements of the road surface at the predicted passing position, a road surface displacement speed that is a time derivative of the road surface displacements at the predicted passing position, an unsprung displacement that is a vertical displacement of an unsprung portion of the vehicle at the predicted passing position, and an unsprung speed that is a time derivative of the unsprung displacement at the predicted passing position; and
a control unit configured to control the control force generating device to change the control force, wherein the control unit is configured to
calculate, as a first control force, the control force for the front wheel when the front wheel passes through the predicted passing position, based on the road surface displacement related information at the predicted passing position of the front wheel,
calculate, as a second control force, the control force for the rear wheel when the rear wheel passes through the predicted passing position, based on the road surface displacement related information at the predicted passing position of the rear wheel,
calculate a combined control force by adding together the first control force and the second control force,
calculate a first final target control force that is a final target value of the control force for the front wheel and a second final target control force that is a final target value of the control force for the rear wheel by distributing the combined control force at a predetermined distribution ratio, control the control force generating device such that the control force generating device generates the control force that agrees with the first final target control force in the front wheel at the timing when the front wheel passes through the predicted passing position of the front wheel, and control the control force generating device such that the control force generating device generates the control force that agrees with the second final target control force in the rear wheel at the timing when the rear wheel passes through the predicted passing position of the rear wheel.

2. The damping control device according to claim 1, wherein:
the control force generating device includes active actuators provided on the wheels, respectively; and
the control unit is configured to calculate the first final target control force and the second final target control force by distributing the combined control force at a higher ratio to an actuator having higher performance out of the active actuator of the front wheel and the active actuator of the rear wheel.

3. A damping control device for a vehicle having wheels including right and left front wheels and right and left rear wheels, the damping control device comprising:
a control force generating device configured to generate a vertical control force for damping a sprung portion of the vehicle between each of the wheels and a portion of a vehicle body that corresponds to a position of each of the wheels;
an information acquirer configured to acquire pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements that are the vertical displacements of the road surface at the predicted passing position, a road surface displacement speed that is a time derivative of the road surface displacements at the predicted passing position, an unsprung displacement that is a vertical displacement of an unsprung portion of the vehicle at the predicted passing position, and an unsprung speed that is a time derivative of the unsprung displacement at the predicted passing position; and
a control unit configured to control the control force generating device to change the control force, wherein the control unit is configured to
calculate a first-situation control force adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel,
calculate a first front wheel control force for the right and left front wheels adapted to the first situation and a first rear wheel control force for the right and left rear wheels adapted to the first situation by distributing the first-situation control force at a predetermined distribution ratio,
calculate a second front wheel control force for the right and left front wheels adapted to a second situation in which the waveform of the road surface displacements on the right side of the vehicle and the waveform of the road surface displacements on the left side of the vehicle have identical phases, based on the road surface displacement related information at the predicted passing position of the right front wheel and the road surface displacement related information at the predicted passing position of the left front wheel,
calculate a second rear wheel control force for the right and left rear wheels adapted to the second situation based on the road surface displacement related information at the predicted passing position of the right rear wheel and the road surface displacement related information at the predicted passing position of the left rear wheel,
calculate a first final target control force that is a final target value of the control force for the left front wheel and a second final target control force that is a final target value of the control force for the right front wheel based on the first front wheel control force and the second front wheel control force,
calculate a third final target control force that is a final target value of the control force for the left rear wheel and a fourth final target control force that is a final target value of the control force for the right rear wheel based on the first rear wheel control force and the second rear wheel control force,
control the control force generating device such that the control force generating device generates the control force that agrees with the first final target control force in the left front wheel at the timing when the left front wheel passes through the predicted passing position of the left front wheel,
control the control force generating device such that the control force generating device generates the control force that agrees with the second final target control force in the right front wheel at the timing when the right front wheel passes through the predicted passing position of the right front wheel,
control the control force generating device such that the control force generating device generates the control force that agrees with the third final target control force in the left rear wheel at the timing when the left rear wheel passes through the predicted passing position of the left rear wheel, and
control the control force generating device such that the control force generating device generates the control force that agrees with the fourth final target control force in the right rear wheel at the timing when the right rear wheel passes through the predicted passing position of the right rear wheel.

4. The damping control device according to claim 3, wherein the control unit is configured to calculate the first-situation control force by adding together a control force adapted to a situation in which a waveform of the road surface displacements at the right front wheel and a waveform of the road surface displacements at the left front wheel have opposite phases and a control force adapted to a situation in which a waveform of the road surface displacements at the right rear wheel and a waveform of the road surface displacements at the left rear wheel have opposite phases.

5. The damping control device according to claim 3, wherein:
the control force generating device includes active actuators provided on the wheels, respectively; and
the control unit is configured to calculate the first front wheel control force and the first rear wheel control force by distributing the first-situation control force at a higher ratio to an actuator having higher performance out of the active actuators of the front wheels and the active actuators of the rear wheels.

6. A damping control device for a vehicle having wheels including right and left front wheels and right and left rear wheels, the damping control device comprising:
a control force generating device configured to generate a vertical control force for damping a sprung portion of the vehicle between each of the wheels and a portion of a vehicle body that corresponds to a position of each of the wheels;
an information acquirer configured to acquire pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements that are the vertical displacements of the road surface at the predicted passing position, a road surface displacement speed that is a time derivative of the road surface displacements at the predicted passing position, an unsprung displacement that is a vertical displacement of an unsprung portion of the vehicle at the predicted passing position, and an unsprung speed that is a time derivative of the unsprung displacement at the predicted passing position; and
a control unit configured to control the control force generating device to change the control force, wherein the control unit is configured to
calculate a first-situation control force adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel,
calculate a first front wheel control force for the right and left front wheels adapted to the first situation and a first rear wheel control force for the right and left rear wheels adapted to the first situation by distributing the first-situation control force at a predetermined distribution ratio,
control, based on the first front wheel control force, the control force to be generated by the control force generating device in the right front wheel at the timing when the right front wheel passes through the predicted passing position of the right front wheel, and the control force to be generated by the control force generating device in the left front wheel at the timing when the left front wheel passes through the predicted passing position of the left front wheel, and
control, based on the first rear wheel control force, the control force to be generated by the control force generating device in the right rear wheel at the timing when the right rear wheel passes through the predicted passing position of the right rear wheel, and the control force to be generated by the control force generating device in the left rear wheel at the timing when the left rear wheel passes through the predicted passing position of the left rear wheel.

7. The damping control device according to claim 6, wherein the control unit is configured to calculate the first-situation control force by adding together a control force adapted to a situation in which the waveform of the road surface displacements at the right front wheel and the waveform of the road surface displacements at the left front wheel have opposite phases and a control force adapted to a situation in which the waveform of the road surface displacements at the right rear wheel and the waveform of the road surface displacements at the left rear wheel have opposite phases.

8. A damping control method for a vehicle, the vehicle having wheels including a front wheel and a rear wheel, and a control force generating device configured to generate a vertical control force for damping a sprung portion of the vehicle between each of the wheels and a portion of a vehicle body that corresponds to a position of each of the wheels, the damping control method comprising:
acquiring pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements that are the vertical displacements of the road surface at the predicted passing position, a road surface displacement speed that is a time derivative of the road surface displacements at the predicted passing position, an unsprung displacement that is a vertical displacement of an unsprung portion of the vehicle at the predicted passing position, and an unsprung speed that is a time derivative of the unsprung displacement at the predicted passing position; and
controlling the control force generating device to change the control force, wherein the controlling includes
calculating, as a first control force, the control force for the front wheel when the front wheel passes through the predicted passing position, based on the road surface displacement related information at the predicted passing position of the front wheel,
calculating, as a second control force, the control force for the rear wheel when the rear wheel passes through the predicted passing position, based on the road surface displacement related information at the predicted passing position of the rear wheel,
calculating a combined control force by adding together the first control force and the second control force,
calculating a first final target control force that is a final target value of the control force for the front wheel and a second final target control force that is a final target value of the control force for the rear wheel by distributing the combined control force at a predetermined distribution ratio, controlling the control force generating device such that the control force generating device generates the control force that agrees with the first final target control force in the front wheel at the timing when the front wheel passes through the predicted passing position of the front wheel, and controlling the control force generating device such that the control force generating device generates the control force that agrees with the second final target control force in the rear wheel at the timing when the rear wheel passes through the predicted passing position of the rear wheel.

9. A damping control method for a vehicle, the vehicle having wheels including right and left front wheels and right and left rear wheels, and a control force generating device configured to generate a vertical control force for damping a sprung portion of the vehicle between each of the wheels and a portion of a vehicle body that corresponds to a position of each of the wheels, the damping control method comprising:

acquiring pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements that are the vertical displacements of the road surface at the predicted passing position, a road surface displacement speed that is a time derivative of the road surface displacements at the predicted passing position, an unsprung displacement that is a vertical displacement of an unsprung portion of the vehicle at the predicted passing position, and an unsprung speed that is a time derivative of the unsprung displacement at the predicted passing position; and controlling the control force generating device to change the control force, wherein the controlling includes calculating a first-situation control force adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel, calculating a first front wheel control force for the right and left front wheels adapted to the first situation and a first rear wheel control force for the right and left rear wheels adapted to the first situation by distributing the first-situation control force at a predetermined distribution ratio, calculating a second front wheel control force for the right and left front wheels adapted to a second situation in which the waveform of the road surface displacements on the right side of the vehicle and the waveform of the road surface displacements on the left side of the vehicle have identical phases, based on the road surface displacement related information at the predicted passing position of the right front wheel and the road surface displacement related information at the predicted passing position of the left front wheel, calculating a second rear wheel control force for the right and left rear wheels adapted to the second situation based on the road surface displacement related information at the predicted passing position of the right rear wheel and the road surface displacement related information at the predicted passing position of the left rear wheel, calculating a first final target control force that is a final target value of the control force for the left front wheel and a second final target control force that is a final target value of the control force for the right front wheel based on the first front wheel control force and the second front wheel control force, calculating a third final target control force that is a final target value of the control force for the left rear wheel and a fourth final target control force that is a final target value of the control force for the right rear wheel based on the first rear wheel control force and the second rear wheel control force, controlling the control force generating device such that the control force generating device generates the control force that agrees with the first final target control force in the left front wheel at the timing when the left front wheel passes through the predicted passing position of the left front wheel, controlling the control force generating device such that the control force generating device generates the control force that agrees with the second final target control force in the right front wheel at the timing when the right front wheel passes through the predicted passing position of the right front wheel, controlling the control force generating device such that the control force generating device generates the control force that agrees with the third final target control force in the left rear wheel at the timing when the left rear wheel passes through the predicted passing position of the left rear wheel, and controlling the control force generating device such that the control force generating device generates the control force that agrees with the fourth final target control force in the right rear wheel at the timing when the right rear wheel passes through the predicted passing position of the right rear wheel.

10. A damping control method for a vehicle, the vehicle having wheels including right and left front wheels and right and left rear wheels, and a control force generating device configured to generate a vertical control force for damping a sprung portion of the vehicle between each of the wheels and a portion of a vehicle body that corresponds to a position of each of the wheels, the damping control method comprising:

acquiring pieces of road surface displacement related information related to vertical displacements of a road surface at a predicted passing position where each of the wheels is predicted to pass at a timing when a predetermined period has elapsed from a current time, each piece of the road surface displacement related information including at least one of road surface displacements that are the vertical displacements of the road surface at the predicted passing position, a road surface displacement speed that is a time derivative of the road surface displacements at the predicted passing position, an unsprung displacement that is a vertical displacement of an unsprung portion of the vehicle at the predicted passing position, and an unsprung speed that is a time derivative of the unsprung displacement at the predicted passing position; and controlling the control force generating device to change the control force, wherein the controlling includes calculating a first-situation control force adapted to a first situation in which a waveform of the road surface displacements on a right side of the vehicle and a waveform of the road surface displacements on a left side of the vehicle have opposite phases, based on the road surface displacement related information at the predicted passing position of the right front wheel, the road surface displacement related information at the predicted passing position of the left front wheel, the road surface displacement related information at the predicted passing position of the right rear wheel, and the road surface displacement related information at the predicted passing position of the left rear wheel, calculating a first front wheel control force for the right and left front wheels adapted to the first situation and a first rear wheel control force for the right and left rear wheels adapted to the first situation by distributing the first-situation control force at a predetermined distribution ratio, controlling, based on the first front wheel control force, the control force to be generated by the control force generating device in the right front wheel at the timing when the right front wheel passes through the predicted passing position of the right front wheel, and the control force to be generated by the control force generating device in the left front wheel at the timing when the left front wheel passes through the predicted passing position of the left front wheel, and controlling, based on the first rear wheel control force, the control force to be generated by the control force generating device in the right rear wheel at the timing when the right rear wheel passes through the predicted passing position of the right rear wheel, and the control force to be generated by the control force generating device in the left rear wheel at the timing when the left rear wheel passes through the predicted passing position of the left rear wheel.

* * * * *